United States Patent
Panikkar et al.

(10) Patent No.: US 12,124,982 B2
(45) Date of Patent: Oct. 22, 2024

(54) SUPPLY CHAIN MANAGEMENT USING BLOCKCHAIN AND MACHINE LEARNING FUNCTIONALITIES

(71) Applicant: Dell Products L.P., Round Rock, TX (US)

(72) Inventors: Shibi Panikkar, Bangalore (IN); Rohit Gosain, Bangalore (IN); Ajay Maikhuri, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/374,313

(22) Filed: Jul. 13, 2021

(65) Prior Publication Data

US 2023/0012566 A1  Jan. 19, 2023

(51) Int. Cl.
*G06Q 10/0631* (2023.01)
*G06F 16/27* (2019.01)
(Continued)

(52) U.S. Cl.
CPC ....... *G06Q 10/06315* (2013.01); *G06F 16/27* (2019.01); *G06Q 10/04* (2013.01);
(Continued)

(58) Field of Classification Search
CPC ............ G06Q 10/06315; G06Q 10/04; G06Q 10/0838; G06Q 10/0875; G06Q 10/10;
(Continued)

(56) References Cited

U.S. PATENT DOCUMENTS 9,779,364 B1 * 10/2017 Hoover ............... G06Q 30/0206
10,902,419 B2 * 1/2021 Soni .................... G06Q 20/3827
(Continued)

FOREIGN PATENT DOCUMENTS

EP  3624026 A1 * 3/2020 ......... G06Q 10/0631
WO  WO-2021197351 A1 * 10/2021 ............. G06F 16/27

OTHER PUBLICATIONS

Federgruen et al., "Selecting a Portfolio of Suppliers Under Demand and Supply Risks," Operations Research, vol. 56, No. 4, Jul.-Aug. 2008, pp. 916-936.
(Continued)

*Primary Examiner* — Abdallah A El-Hage Hassan
(74) *Attorney, Agent, or Firm* — Ryan, Mason & Lewis, LLP

(57) ABSTRACT

An initial transaction is generated representing a forecasted demand for material needed to manufacture equipment via a supply chain. The initial transaction is added to a blockchain for access by entities in the supply chain comprising at least a subset of one or more supply entities, one or more material distribution entities, and one or more manufacturing entities. In one or more examples, the steps may be performed by an OEM blockchain node that accesses any transactions added by the various entities on the blockchain node and limits access to transactions on the blockchain by the various entities. Further, the initial transaction may be a main transaction and a transaction representing a commitment by one of the supply entities may be a sub-transaction of the main transaction, and the sub-transaction is closed in the blockchain upon the request for payment for the committed material or payment of the request.

20 Claims, 19 Drawing Sheets

(51) Int. Cl.
*G06N 20/00* (2019.01)
*G06Q 10/04* (2023.01)
*G06Q 10/083* (2024.01)
*G06Q 10/0875* (2023.01)
*G06Q 10/10* (2023.01)
*G06Q 20/38* (2012.01)
*G06Q 50/04* (2012.01)

(52) U.S. Cl.
CPC ..... *G06Q 10/0838* (2013.01); *G06Q 10/0875* (2013.01); *G06Q 10/10* (2013.01); *G06Q 20/389* (2013.01); *G06N 20/00* (2019.01); *G06Q 50/04* (2013.01)

(58) Field of Classification Search
CPC ...... G06Q 20/389; G06Q 50/04; G06F 16/27; G06N 20/00
USPC ........................................................ 705/7.25
See application file for complete search history.

(56) References Cited

U.S. PATENT DOCUMENTS

| | | | | |
|---|---|---|---|---|
| 10,970,669 | B2* | 4/2021 | Yund | G06Q 10/0838 |
| 11,037,211 | B2* | 6/2021 | Preston | G06Q 30/0283 |
| 11,055,658 | B2* | 7/2021 | Jacobson | G06F 16/182 |
| 11,164,267 | B2* | 11/2021 | Singh | G06F 16/27 |
| 11,341,457 | B2* | 5/2022 | Paulson | G06Q 10/087 |
| 11,410,105 | B2* | 8/2022 | Gill | G06Q 10/0635 |
| 2021/0081840 | A1* | 3/2021 | Darmour | G06F 18/22 |

OTHER PUBLICATIONS

B. Stecanella, "An Introduction to Support Vector Machines (SVM)" https://monkeylearn.com/blog/introduction-to-support-vector-machines-svm/#:~:text=A%20support%20vector%20machine%20(SVM,able%20to%20categorize%20new%20text, Jun. 22, 2017, 20 pages.
Wikipedia, "Support-vector Machine," https://en.wikipedia.org/wiki/Support-vector_machine, Apr. 18, 2021, 20 pages.
Wikipedia, "Linear Regression," https://en.wikipedia.org/wiki/Linear_regression, Apr. 15, 2021, 17 pages.
Bayes Server, "Prediction with Bayesian Networks," https://www.bayesserver.com/docs/techniques/prediction#:~:text=Joint%20prediction,are%20in%20the%20same%20model, Accessed Apr. 19, 2021, 10 pages.
Wikipedia, "Machine Learning," https://en.wikipedia.org/wiki/Machine_learning, Jul. 5, 2021, 26 pages.
Wikipedia, "Blockchain," https://en.wikipedia.org/wiki/Blockchain, Jul. 4, 2021, 28 pages.
U.S. Appl. No. 17/237,204 filed in the name of Shibi Panikkar et al, filed Apr. 22, 2021, and entitled "Artificial Intelligence-Based Attach Rate Planning for Computer-Based Supply Planning Management System."

* cited by examiner

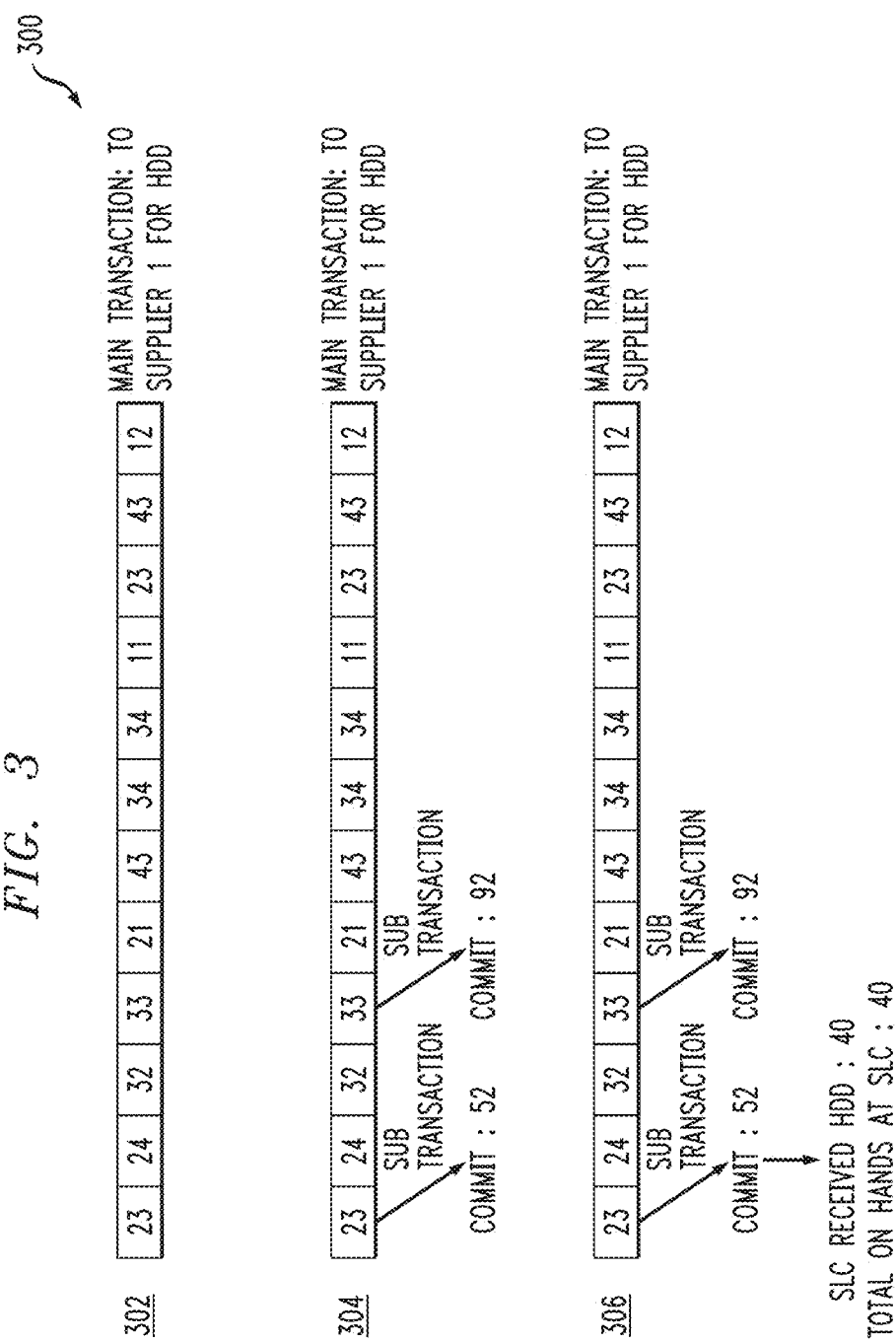

FIG. 6

| FEATURES | | INSIGHTS | SCORE |
|---|---|---|---|
| SUPPLY EFFICIENCY | PRODUCTION CAPACITY LOCATION | HISTORICAL PRODUCTION PROBLEMATIC LOCATIONS | EFFICIENCY SCORE 602 |
| CHANGE FLEXIBILITY | QUANTITY FLEXIBILITY QUALITY FLEXIBILITY DELIVERY FLEXIBILITY | PAST ORDER COMMITMENT MISSES OVERALL RETURN RATE UNDERSTAND DELIVERY STRENGTHS/WEAKNESS | FLEXIBILITY SCORE 604 |
| SUPPLIER STRENGTH | QUALITY LEVEL INNOVATION FINANCE SPECIALIZATION | HISTORICAL DEFECT RATE AND TREND HISTORICAL NEW PRODUCT LAUNCHES | STRENGTH SCORE 606 |
| COST | COMPETITIVE FACTOR PAYMENT TERMS VOLUME DISCOUNTS | OVERALL COST COMPETITIVENESS | COST SCORE 608 |
| TIME | ON-TIME DELIVERY TIME TO DELIVER | AVERAGE TIME TO DELIVER | TIME SCORE 610 |
| RISKS | OPERATION UNCERTAINTY DEFECT% | OVERALL RISK | RISK SCORE 612 |

| ITEM | SITE | SUPPLIER_NAME | DATA_MEASURE | MRP_4 | MRP_5 | MRP_6 | MRP_7 | MRP_8 | MRP_9 | MRP_10 | MRP_11 | MRP_12 | MRP_13 | MRP_14 | MRP_15 |
|---|---|---|---|---|---|---|---|---|---|---|---|---|---|---|---|
| FV56Y | APCC | SUPPLIER 1 | BACKLOG | 13 | 13 | | | | | | | | | | |
| FV56Y | APCC | SUPPLIER 1 | COMMIT AIR | | | | 0 | | | | 500 | | | 500 | |
| FV56Y | APCC | SUPPLIER 1 | FACTORY ON-HAND | 3137 | 3083 | | | | | | | | | | |
| FV56Y | APCC | SUPPLIER 1 | FACTORY ON-HAND (ACTUAL) | 3137 | 3083 | | | | | | | | | | |
| FV56Y | APCC | SUPPLIER 1 | FORECAST | 23 | 22 | 22 | 23 | | | 17 | 17 | 17 | 17 | 17 | |
| FV56Y | APCC | SUPPLIER 1 | FUTURE BACKLOG | | | | | | | | | | | | |
| FV56Y | APCC | SUPPLIER 1 | NET SUPPLY | | | | | | | | 500 | | | 500 | |
| FV56Y | APCC | SUPPLIER 1 | NET SUPPLY AIR | | | | | | | | 500 | | | 500 | |
| FV56Y | APCC | SUPPLIER 1 | NORMALIZED FORECAST | 23 | 22 | 22 | 23 | | | 17 | 17 | 17 | 17 | 17 | |
| FV56Y | APCC | SUPPLIER 1 | PROJECTED DSI | 0 | 251.9 | 250.08 | 248.18 | 283.3 | 283.3 | 281.7 | 327.26 | 325.66 | 324.06 | 369.62 | 373.14 |
| FV56Y | APCC | SUPPLIER 1 | PROJECTED INVENTORY | | 3048 | 3026 | 3003 | 3003 | 3003 | 2986 | 3469 | 3452 | 3435 | 3918 | 3918 |
| FV56Y | APCC | SUPPLIER 1 | PROJECTED INVENTORY (BUYER) | | 3048 | 3026 | 3003 | 3003 | 3003 | 2986 | 3469 | 3452 | 3435 | 3918 | 3918 |
| FV56Y | APCC | SUPPLIER 1 | RELEASED FORECAST | 23 | 22 | 22 | 23 | | | 17 | 17 | 17 | 17 | 17 | |
| FV56Y | APCC | SUPPLIER 1 | RUN RATE | 2 | | | | | | | | | | | |

904

| ITEM | SITE | SUPPLIER_NAME | DATA_MEASURE | MRP_4 | MRP_5 | MRP_6 | MRP_7 | MRP_8 | MRP_9 | MRP_10 | MRP_11 | MRP_12 | MRP_13 | MRP_14 | MRP_15 |
|---|---|---|---|---|---|---|---|---|---|---|---|---|---|---|---|
| FV56Y | APCC | SUPPLIER 1 | PROJECTED INVENTORY | 0 | 3048 | 3026 | 3003 | 3003 | 3003 | 2986 | 3469 | 3452 | 3435 | 3918 | 3918 |
| FV56Y | APCC | SUPPLIER 1 | SUPPLIER COMMIT | 0 | 3048 | 0 | 6000 | | 4000 | | | | | | |

| ITEM | SITE | SUPPLIER_NAME | DATA_MEASURE | MRP_4 | MRP_5 | MRP_6 | MRP_7 | MRP_8 | MRP_9 | MRP_10 | MRP_11 | MRP_12 | MRP_13 | MRP_14 | MRP_15 |
|---|---|---|---|---|---|---|---|---|---|---|---|---|---|---|---|
| FV56Y | APCC | SUPPLIER 1 | PROJECTED INVENTORY | | 3048 | 3026 | 3003 | 3003 | 3003 | 2986 | 3469 | 3452 | 3435 | 3918 | 3918 |
| FV56Y | APCC | SUPPLIER 1 | SUPPLIER COMMIT | 0 | 3048 | 0 | 6000 | | 4000 | | | | | | |
| FV56Y | APCC | SUPPLIER 1 | SHIPMENT STARTED | 0 | 3048 | | | | | | | | | | |

1104

| ITEM | SITE | SUPPLIER_NAME | DATA_MEASURE | MRP_4 | MRP_5 | MRP_6 | MRP_7 | MRP_8 | MRP_9 | MRP_10 | MRP_11 | MRP_12 | MRP_13 | MRP_14 | MRP_15 |
|---|---|---|---|---|---|---|---|---|---|---|---|---|---|---|---|
| FV56Y | APCC | SUPPLIER 1 | PROJECTED INVENTORY | | 3048 | 3026 | 3003 | 3003 | 3003 | 2986 | 3469 | 3452 | 3435 | 3918 | 3918 |
| FV56Y | APCC | SUPPLIER 1 | SUPPLIER COMMIT | 0 | 3048 | 0 | 6000 | | 4000 | | | | | | |
| FV56Y | APCC | SUPPLIER 1 | OEM ACKNOWLEDGE | 0 | 3048 | | 6000 | | 4000 | | | | | | |
| FV56Y | APCC | SUPPLIER 1 | SHIPMENT STARTED | 0 | 3048 | | | | | | | | | | |
| FV56Y | APCC | SUPPLIER 1 | SHIPMENT RECEIVED | 0 | 3048 | | | | | | | | | | |

1106

| ITEM | SITE | SUPPLIER_NAME | DATA_MEASURE | MRP_4 | MRP_5 | MRP_6 | MRP_7 | MRP_8 | MRP_9 | MRP_10 | MRP_11 | MRP_12 | MRP_13 | MRP_14 | MRP_15 |
|---|---|---|---|---|---|---|---|---|---|---|---|---|---|---|---|
| FV56Y | APCC | SUPPLIER 1 | PROJECTED INVENTORY | | 3048 | 3026 | 3003 | 3003 | 3003 | 2986 | 3469 | 3452 | 3435 | 3918 | 3918 |
| FV56Y | APCC | SUPPLIER 1 | SUPPLIER COMMIT | 0 | 3048 | 0 | 6000 | | 4000 | | | | | | |
| FV56Y | APCC | SUPPLIER 1 | OEM ACKNOWLEDGE | 0 | 3048 | | 6000 | | 4000 | | | | | | |
| FV56Y | APCC | SUPPLIER 1 | SHIPMENT STARTED | 0 | 3048 | | | | | | | | | | |
| FV56Y | APCC | SUPPLIER 1 | SHIPMENT RECEIVED | 0 | 3048 | | | | | | | | | | |
| FV56Y | APCC | SUPPLIER 1 | MOVED TO FACTORY | 0 | 1000 | | | | | | | | | | |

| ITEM | SITE | SUPPLIER_NAME | DATA_MEASURE | MRP_4 | MRP_5 | MRP_6 | MRP_7 | MRP_8 | MRP_9 | MRP_10 | MRP_11 | MRP_12 | MRP_13 | MRP_14 | MRP_15 |
|---|---|---|---|---|---|---|---|---|---|---|---|---|---|---|---|
| FV56Y | APCC | SUPPLIER 1 | PROJECTED INVENTORY | | 3048 | 3026 | 3003 | 3003 | 3003 | 2986 | 3469 | 3452 | 3435 | 3918 | 3918 |
| FV56Y | APCC | SUPPLIER 1 | SUPPLIER COMMIT | 0 | 3048 | 0 | 6000 | | 4000 | | | | | | |
| FV56Y | APCC | SUPPLIER 1 | OEM ACKNOWLEDGE | 0 | 3048 | 0 | 6000 | | 4000 | | | | | | |
| FV56Y | APCC | SUPPLIER 1 | SHIPMENT STARTED | 0 | 3048 | | | | | | | | | | |
| FV56Y | APCC | SUPPLIER 1 | SHIPMENT RECEIVED | 0 | 3048 | | | | | | | | | | |
| FV56Y | APCC | SUPPLIER 1 | PO RAISED | 0 | 3048 | | | | | | | | | | |

1110

| ITEM | SITE | SUPPLIER_NAME | DATA_MEASURE | MRP_4 | MRP_5 | MRP_6 | MRP_7 | MRP_8 | MRP_9 | MRP_10 | MRP_11 | MRP_12 | MRP_13 | MRP_14 | MRP_15 |
|---|---|---|---|---|---|---|---|---|---|---|---|---|---|---|---|
| FV56Y | APCC | SUPPLIER 1 | PROJECTED INVENTORY | | 3048 | 3026 | 3003 | 3003 | 3003 | 2986 | 3469 | 3452 | 3435 | 3918 | 3918 |
| FV56Y | APCC | SUPPLIER 1 | SUPPLIER COMMIT | 0 | 3048 | 0 | 6000 | | 4000 | | | | | | |
| FV56Y | APCC | SUPPLIER 1 | OEM ACKNOWLEDGE | 0 | 3048 | 0 | 6000 | | 4000 | | | | | | |
| FV56Y | APCC | SUPPLIER 1 | SHIPMENT STARTED | 0 | 3048 | | | | | | | | | | |
| FV56Y | APCC | SUPPLIER 1 | SHIPMENT RECEIVED | 0 | 3048 | | | | | | | | | | |
| FV56Y | APCC | SUPPLIER 1 | PO RAISED | 0 | 3048 | | | | | | | | | | |
| FV56Y | APCC | SUPPLIER 1 | PAYMENT INITIATED | 0 | 3048 | | | | | | | | | | |

*FIG. 11 cont.*

| ITEM | SITE | SUPPLIER_NAME | DATA_MEASURE | MRP_4 | MRP_5 | MRP_6 | MRP_7 | MRP_8 | MRP_9 | MRP_10 | MRP_11 | MRP_12 | MRP_13 | MRP_14 | MRP_15 |
|---|---|---|---|---|---|---|---|---|---|---|---|---|---|---|---|
| FV56Y | APCC | SUPPLIER 1 | PROJECTED INVENTORY |  | 3048 | 3026 | 3003 | 3003 | 3003 | 2986 | 3469 | 3452 | 3435 | 3918 | 3918 |
| FV56Y | APCC | SUPPLIER 1 | SUPPLIER COMMIT | 0 | 3048 | 0 | 6000 |  | 4000 |  |  |  |  |  |  |
| FV56Y | APCC | SUPPLIER 1 | OEM ACKNOWLEDGE | 0 | 3048 | 0 | 6000 |  | 4000 |  |  |  |  |  |  |
| FV56Y | APCC | SUPPLIER 1 | SHIPMENT STARTED | 0 | 3048 |  |  |  |  |  |  |  |  |  |  |
| FV56Y | APCC | SUPPLIER 1 | SHIPMENT RECEIVED | 0 | 3048 |  |  |  |  |  |  |  |  |  |  |
| FV56Y | APCC | SUPPLIER 1 | PO RAISED | 0 | 3048 |  |  |  |  |  |  |  |  |  |  |
| FV56Y | APCC | SUPPLIER 1 | PAYMENT INITIATED | 0 | 3048 |  |  |  |  |  |  |  |  |  |  |
| FV56Y | APCC | SUPPLIER 1 | PAYMENT RECEIVED | 0 | 3048 |  |  |  |  |  |  |  |  |  |  |

1112

1100 cont'd

SUPPLY CHAIN MANAGEMENT USING BLOCKCHAIN AND MACHINE LEARNING FUNCTIONALITIES

FIELD

The field relates generally to information processing systems, and more particularly to supply chain management in such information processing systems.

DESCRIPTION

In the current manufacturing industry, the amount of raw material needed to be procured and stored is an ongoing issue for entities such as, but not limited to, original equipment manufacturers (OEMs). By way of example only, raw material (or simply, material) that is used to manufacture computing and/or storage equipment ordered by a customer via an OEM may include, but is not limited to, electronic storage drives. Typically, in making procurement decisions, buyers for OEMs depend on supply chain concepts such as batch updates of backlogs, on-hand inventory, vendor-owned inventory, and order run rate. Now, with the availability of advanced analytics, buyers can use forecasting techniques to attempt to predict the average projected inventory to be procured and stocked. However, since inventory can be scattered across many different entities (e.g., supplier, supplier logistics centers (SLCs), manufacturing locations (factories, original design manufacturers or ODMs, etc.), lack of visibility of inventory makes the prediction accuracy relatively low. Moreover, current business-to-business (B2B) communications in certain industries is typically asynchronous. As such, the accuracy of different inventory levels is not always reliable, making prediction less accurate.

As a result, buyers are forced to buy more inventory so as to avoid shortage due to inaccurate visibility of the actual inventory. However, a procurement objective in OEM and other industries is to minimize a metric known as a daily stock indicator (DSI). An important goal is to keep the DSI metric as low as possible so as to reduce operating cost.

SUMMARY

Illustrative embodiments provide supply chain management techniques in an information processing system.

For example, in an illustrative embodiment, a method comprises the following steps. An initial transaction is generated representing a forecasted demand for material needed to manufacture equipment via a supply chain. The initial transaction is added to a blockchain for access by entities in the supply chain comprising at least a subset of one or more supply entities, one or more material distribution entities, and one or more manufacturing entities.

In one or more illustrative embodiments, the steps are performed by an OEM blockchain node. For example, the OEM blockchain node is configured to access via the blockchain any transactions generated by the various entities, while the various entities are limited to accessing their own transactions. Further, the OEM blockchain node may be further configured to generate a ranking of the one or more supply entities based on a set of scores generated using one or more machine learning algorithms. The OEM blockchain node can then compute a total availability of material percentage for each of the one or more supply entities based on at least a portion of the set of scores. Advantageously, the OEM blockchain node controls access to transactions on the blockchain by the one or more supply entities, the one or more material distribution entities, and the one or more manufacturing entities.

Also, in some illustrative embodiments, the initial transaction is a main transaction and a transaction representing a commitment by one of the supply entities is a sub-transaction of the main transaction, and the sub-transaction is closed in the blockchain upon the request for payment for the committed material or payment of the request.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other illustrative embodiments include, without limitation, apparatus, systems, methods and computer program products comprising processor-readable storage media.

BRIEF DESCRIPTION OF THE DRAWINGS

FIG. 6 illustrates a tabular representation of a set of scores used by a neural network model to determine a ranked supplier portfolio list according to an illustrative embodiment.

FIG. 9 illustrates a set of transaction blocks generated during a supply chain management process according to an illustrative embodiment.

FIG. 11 illustrates a further set of transaction blocks generated during a supply chain management process according to an illustrative embodiment.

DETAILED DESCRIPTION

Figure 1:
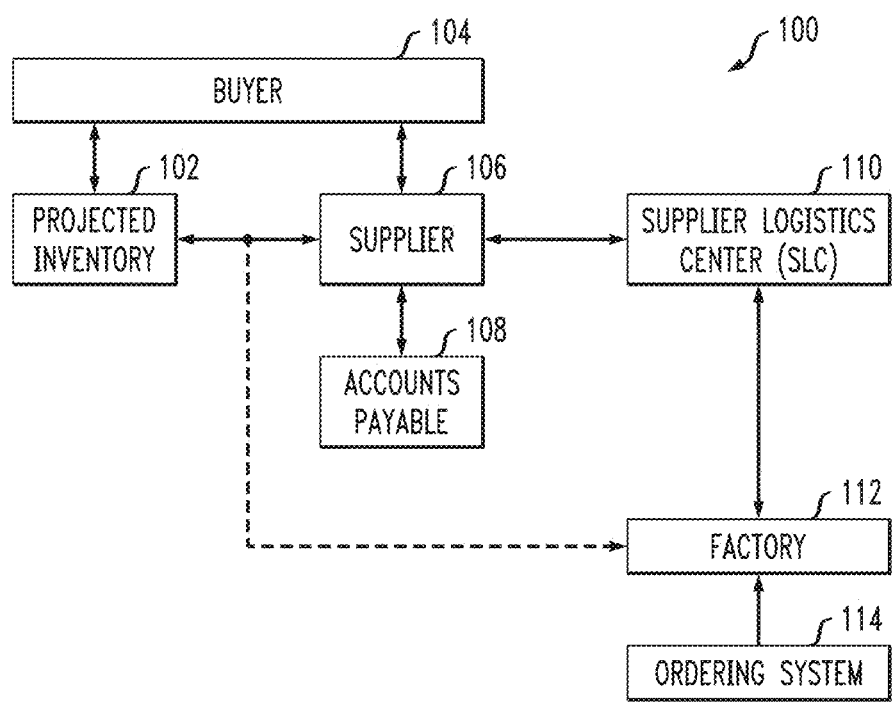
FIG. 1 depicts a supply chain model with which one or more illustrative embodiments can be implemented.

As mentioned above in the background section, existing supply chain management suffers from poor inventory management. More particularly, for example, it is realized herein that some main problems in supply chain management in any manufacturing industry are: (i) a lack of visibility of timely data between entities involved in raw material management; (ii) different entities follow their own forecasting for raw material supplies; (iii) an OEM has to keep a higher level of safety stock, leading to a higher operating cost; and (iv) a higher rate of financial loss due to non-transparency in transactions between suppliers and factories.

Illustrative embodiments address the above and other issues with existing supply chain management by providing a system and methodology enabling controlled real-time visibility of trusted data and transactions between entities in a supply chain. The system and methodology provide many advantages, examples of which are mentioned herein.

For example, in illustrative embodiments, an OEM (e.g., Dell Technologies Inc.) is able to access all suppliers' transactions whereas suppliers and other entities are only able to access their respective transactions. OEM and supplier contracts are visible for the supply. Total availability of material (TAM) allocation among the suppliers is considered for the same material (e.g., same products, items, commodities, etc.). Suppliers have visibility of projected inventory which is, for example, supply (e.g., OEM inventory plus vendor inventory) minus demand (e.g., material forecast plus order backlog). OEM receives the supplier commitments (commits) against the projected inventory. If the supplier under commits, the visibility of such under-commitment helps the OEM to initiate a remediation process. OEM knows how much material each supplier shipped as per the commitment to a specific supplier logistics center (SLC). A supplier knows the raw material status of the SLC. Each factory knows the raw material status of their SLC. A supplier knows their material consumption by the factory. Supplied material visibility is enabled for the OEM's finance system as well.

As illustratively used herein, a supplier may be more generally referred to as a "supply entity," an SLC may be more generally referred to as a "material distribution entity," and a factory may be more generally referred to as a "manufacturing entity."

Furthermore, in illustrative embodiments, a smart contract validates invoices and movement of material. Also, if there is any change in a transaction, then the system and methodology enable the change to be digitally signed by either of the entities. For example, when a specific supplier wants to change the raw material demand from the OEM, then when the supplier updates the transaction, the OEM now has visibility to that event and can provide a digital signature to perform more transactions by a supplier.

The above and other advantages are implemented using a customized blockchain architecture between entities with provider-specific custom logic. In one or more illustrative embodiments, an OEM serves as a central provider/buyer in the blockchain architecture. Each supplier has access to its own supplier data in the blockchain. The OEM has access to all supplier data, as well as any other data added to the blockchain since the OEM controls the blockchain. The OEM provides a demand forecast, and raw material requests are digitally signed by the suppliers. A supplier forecast for the OEM is digitally signed by the OEM. An amendment in the OEM requirement by a supplier is digitally signed by the OEM. Material that is sent to the SLC from each supplier is digitally signed by the OEM. SLC to factory material transfers are digitally signed by the OEM. Alternative digital signature policies can be implemented. By way of example, the OEM has full view of material present in each factory and SLC which advantageously assists in ordering and predicting delivery dates accurately and assists in preventing material shortages in the order. Still further, the OEM has full view of supplier-shipped material which advantageously assists in preventing any discrepancy in payment to each supplier.

FIGS. 1 through 15 illustrate details of system and methodologies for improved supply chain management utilizing a blockchain architecture and artificial intelligence/machine learning (AI/ML) functionalities according to illustrative embodiments.

As shown in FIG. 1, a supply chain model 100 comprises an OEM projected inventory 102, an OEM buyer (procurement) 104, a supplier 106, an OEM accounts payable (financials) 108, a supplier logistics center (SLC) 110, a factory 112, and an OEM ordering system 114. Supply chain model 100 is an example of an end-to-end (E2E) procure-to-pay model.

In supply chain model 100, the OEM shares projected inventory 102 with supplier 106. Projected inventory 102 is typically supply minus demand. The supply may include inventory from an SLC, e.g., SLC 110, an original design manufacturer (ODM), and/or other sources. The OEM may use a forecast and backlog (future and current) for demand. The OEM shares information on a daily basis with suppliers, e.g., supplier 106. Suppliers, e.g., supplier 106, run their own forecast based on all their buyers, e.g., including OEM buyer 104, but may or may not take into account the OEM projected inventory 102. Supplier 106 commits against projected inventory 102 and ships the material to SLC 110. However, from the perspective of SLC 110, there is no link between the commitment and the shipment. SLC 110 receives the material from supplier 106. Factory 112 receives the order from ordering system 114 and pulls the needed materials from SLC 110 to perform the product manufacturing process. OEM accounts payable 108 receives an invoice from supplier 106 and matches quantity and price against the purchase order, receipts and the invoice. If correct, the OEM accounts payable 108 pays supplier 106. However, if any discrepancies are noted then payment is put on hold.

While supply chain model 100 generally functions to get ordered equipment manufactured, it is realized herein that there is a lack of data visibility for each entity with respect to each other entity, and no entity has any level of trust in transactions between entities. Accordingly, each entity relies on approximations and/or individual localized systems associated with the entities have to re-calculate data which adds extra time to the manufacturing process, e.g., supplier 106 approximates the needs of the OEM, factory 112 approximates the needs of ordering system 114, supplier 106 re-calculates the forecast, payment may be put on hold by OEM accounts payable 108 until any discrepancies caused by approximations and lack of information are resolved. These delays are costly in terms of time and money to the various entities in supply chain model 100, e.g., the OEM may have to maintain a larger safety stock, i.e., larger inventory, which leads to increased operating costs.

Illustrative embodiments overcome the above and other drawbacks by providing controlled real-time visibility of trusted data and transactions between these entities. For example, in accordance with illustrative embodiments in the context of supply chain model 100 of FIG. 1, the OEM is able see transactions of supplier 106 and SLC 110, whereas supplier 106 and SLC 110 only see their respective transactions. OEM/supplier contract (i.e., smart contract) visibility is also available. TAM allocation is provided among multiple suppliers for the same commodities. Recall that supplier 106 receives projected inventory 102 and the OEM receives commits from supplier 106 against projected inventory 102. If supplier 106 under-commits, the visibility provided by illustrative embodiments helps the OEM to initiate one or more remediation processes. The OEM also knows how much material each supplier shipped as per the commitment and to which SLC. Supplier 106 knows the raw material status of SLC 110. Each factory, e.g., factory 112, knows the raw material status of its SLC, e.g., SLC 110. Supplier 106 knows material consumption by factory 112. Each supplier-supplied material is visible to OEM accounts payable 108. Also, any changes needed in a transacted document or other data exchange are digitally signed by one or more of the entities as needed. For example, when a specific supplier wants to change the raw material demand from the OEM, then when the supplier updates the document, the OEM now has visibility and signs to enable more transactions by the supplier.

Figure 2:
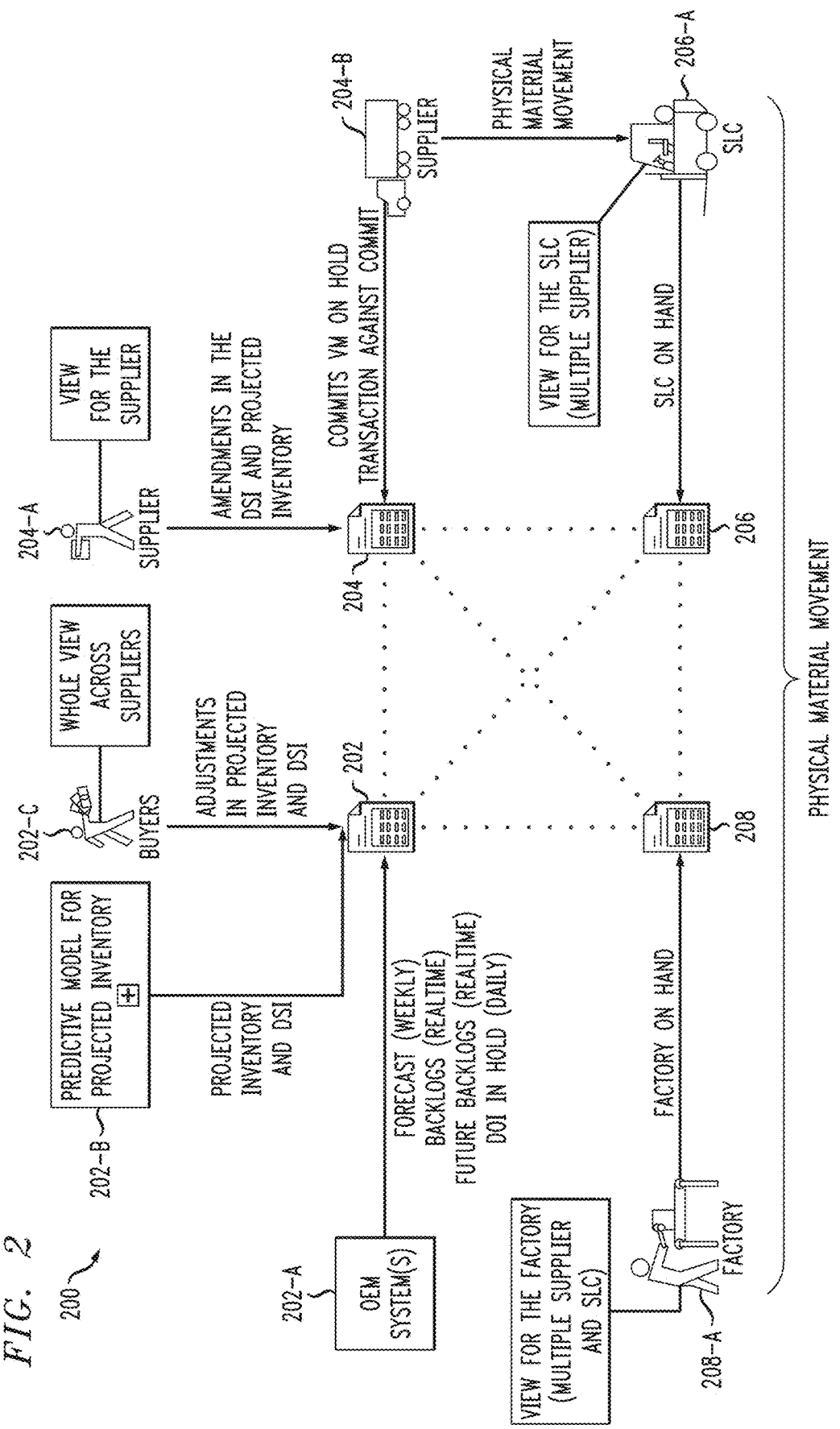
FIG. 2 depicts a blockchain architecture for supply chain management according to an illustrative embodiment.

As mentioned, illustrative embodiments provide the above and other features using a customized blockchain architecture between entities in the supply chain model with provider-specific custom logic. FIG. 2 illustrates a blockchain architecture 200 for supply chain management according to an illustrative embodiment. More particularly, by way of example, a supply chain model such as supply chain model 100 in FIG. 1 can be implemented in blockchain architecture 200 of FIG. 2. Thus, as shown, blockchain architecture 200 comprises blockchain nodes 202, 204, 206 and 208 wherein each blockchain node is associated with an entity in supply chain model 100, e.g., OEM (blockchain node 202), supplier (blockchain node 204), SLC (blockchain node 206) and factory (blockchain node 208). As will be further explained below, OEM blockchain node 202 provides centralized control of a private and permissioned blockchain protocol implemented by architecture 200 (i.e., the OEM gets to determine who sees what on the blockchain).

As used herein, the terms "blockchain," "chain," "distributed ledger," and "ledger" may be used interchangeably. As is known, the blockchain protocol is implemented via a distributed, decentralized computer network of compute nodes (e.g., blockchain nodes 202, 204, 206 and 208). The compute nodes are operatively coupled in a peer-to-peer communications protocol (e.g., as illustratively depicted as blockchain architecture 200 in FIG. 2). In the computer network, each compute node is configured to maintain a blockchain which is a cryptographically secured record or ledger of data blocks that represent respective transactions within a given computational environment. The blockchain is secured through use of a cryptographic function, e.g., a hash function. A hash function is a cryptographic function which takes an input (or "message") and returns a fixed-size alphanumeric string, which is called the hash value (also a message digest, a digital fingerprint, a digest, or a checksum). Other cryptographic functions can be employed.

Each blockchain is thus a growing list of data records (i.e., blocks) hardened against tampering and revision. Each block may typically include data for multiple transactions (e.g., current transaction and previous transactions) and a link to a previous block. Thus, advantageously, each data block in the blockchain represents a given set of transaction data plus a set of all previous transaction data.

A key principle of the blockchain is that it is trusted. That is, it is critical to know that data in the blockchain has not been tampered with by any of the compute nodes in the computer network (or any other node or party). For this reason, a hash function is used. While such a hash function is relatively easy to compute for a large data set, each resulting hash value is unique such that if one item of data in the blockchain is altered, the hash value changes.

Further, it is to be appreciated that a blockchain protocol typically forms a consensus network whereby a transaction is added to the blockchain when validated by a consensus of compute nodes (e.g., blockchain nodes 202, 204, 206, and 208). That is, if consensus is reached, then each compute node adds the new block to the blockchain they currently maintain. As a result, after a new transaction is processed by blockchain architecture 200, each blockchain node 202, 204, 206, and 208 should now have a copy of the same updated blockchain stored in its memory. Then, when a new transaction comes into the system, the consensus process is repeated. Note that many different types of consensus protocols may be used (e.g., proof of work, proof of stake, proof of elapsed time, etc.) and illustrative embodiments need not be limited to any particular type of consensus protocol. Also, while all the blockchain nodes typically participate in the consensus protocol, a subset of blockchain nodes can participate in various embodiments. Also, while each blockchain node maintains a local updated copy of the blockchain, in illustrative embodiments, only OEM blockchain nodes are given a full view (i.e., full access) to all transactions in the blockchain, as will be further explained. When given access, transactions are visible in the blockchain, typically using a blockchain browser, whereby a transaction can be viewed in human-readable terms.

It is to be appreciated that the above descriptions represent illustrative implementations of blockchain and consensus protocols and that embodiments of the invention are not limited to the above or any particular blockchain or consensus protocol implementation. As such, other appropriate processes may be used to securely maintain and add to a set of data in accordance with embodiments of the invention. For example, distributed ledgers such as, but not limited to, R3 Corda, Quorum, Ethereum, and Hyperledger Fabric may be employed in illustrative embodiments.

Continuing to refer to FIG. 2, as shown, each blockchain node may have one or more systems, departments, individuals, etc. that provide transactions or other data and/or have access to view all or parts of the blockchain. For example, blockchain node 202 is associated with an OEM in the supply chain model and thus is accessible by: OEM systems(s) 202-A which provide information relating to forecasts, backlogs (present and future), daily OEM information, etc.; a predictive model 202-B which provides a projected inventory and a DSI metric; and buyer personnel and systems 202-C which provides adjustments to the projected inventory and DSI metric and has a whole transactional view of the blockchain including across all suppliers, factories and SLCs. Alternatively, the OEM can have multiple blockchain nodes that are respectively used by multiple systems, departments, individuals of the OEM. Blockchain node 204 is associated with a supplier in the supply chain model and thus is accessible by: supplier personnel and systems 204-A that provides amendments to the projected inventory and DSI metric; and supplier personnel and systems 204-B that are responsible for commits and transactions against commits, each of which has a limited transactional view of the blockchain for transactions that the supplier creates (i.e., supplier personnel can only view their own transactions on the blockchain). Alternatively, the supplier can have multiple blockchain nodes that are respectively used by multiple systems, departments, individuals of the supplier.

Further, blockchain node 206 is associated with an SLC in the supply chain model and thus is accessible by SLC personnel and systems 206-A that provides information related to SLC actions and activities and which has a limited transactional view of the blockchain for transactions that the SLC creates, as well as its corresponding suppliers. Blockchain node 208 is associated with a factory in the supply chain model and thus is accessible by factory personnel and systems 208-A that provides information related to factory actions and activities and which has a limited transactional view of the blockchain for transactions that the factory creates, as well as its corresponding suppliers and SLCs. Alternatively, the SLC and factory can each have multiple blockchain nodes that are respectively used by their multiple systems, departments, and individuals.

Recall that as mentioned above, illustrative embodiments provide a customized blockchain architecture, e.g., blockchain architecture 200. By way of example, the term customized illustratively refers to logic in each blockchain node 202, 204, 206, and 208 that defines and otherwise supports transactions and other data in one or more formats that are understood by each entity operating on the blockchain architecture 200. The logic in each blockchain node may also be configured to perform other functions as will be further described herein.

Figure 3:
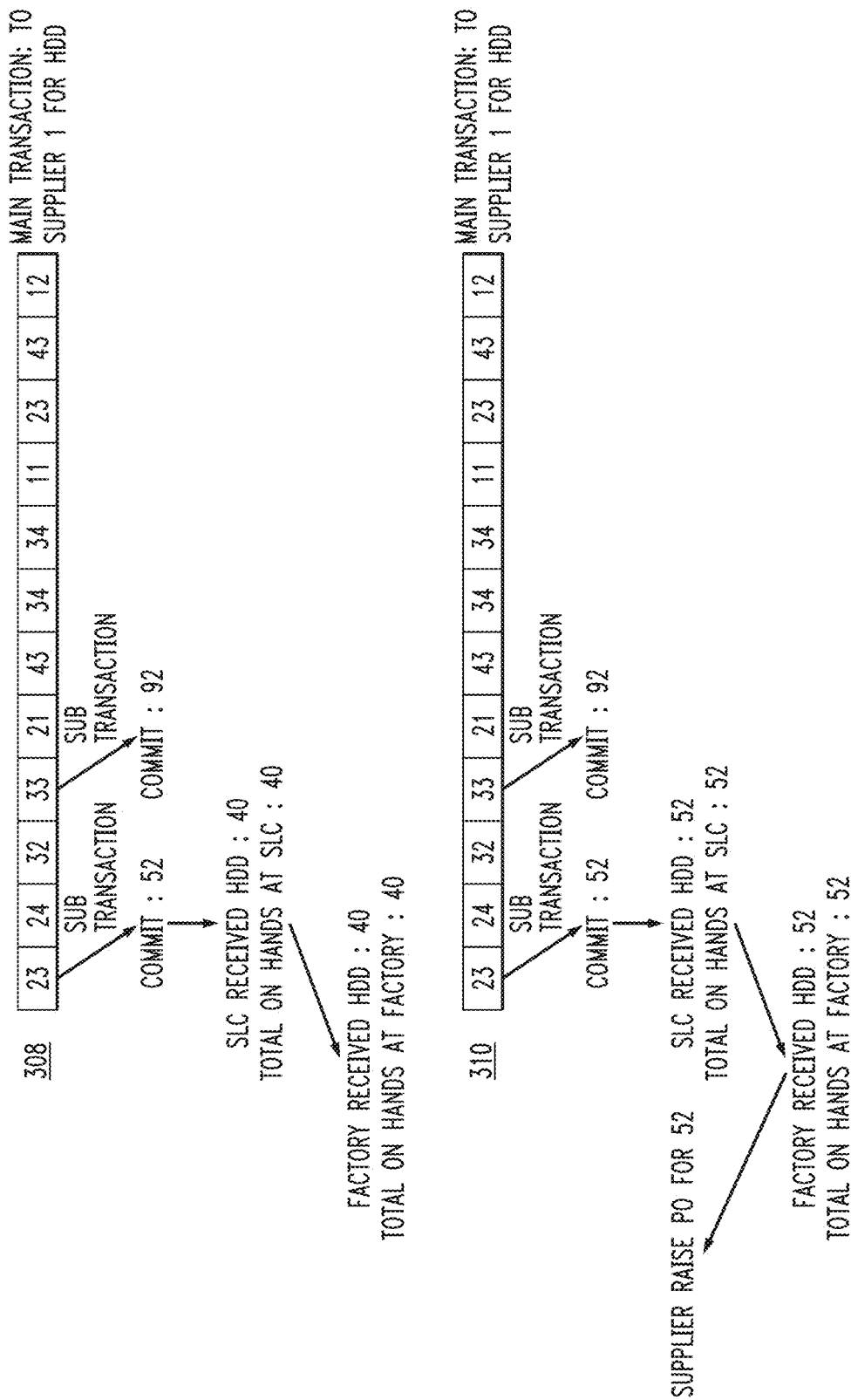
FIG. 3 illustrates a set of steps associated with transactions that are defined and otherwise supported by a blockchain architecture according to an illustrative embodiment.
Figure 3:
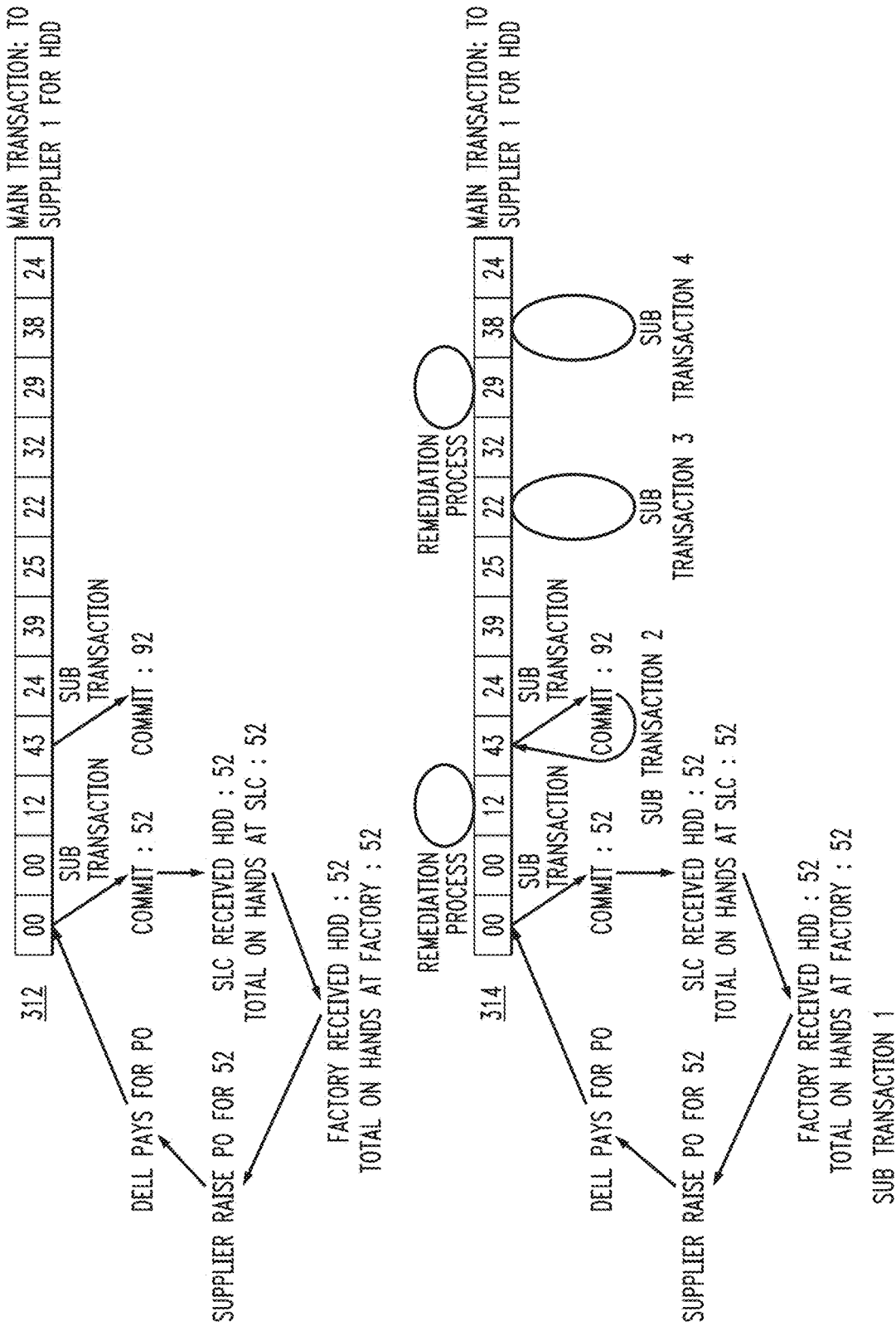

FIG. 3 illustrates a set of steps 300 associated with transactions that are defined and otherwise supported by blockchain architecture 200. For example, as shown in step 302, a transaction considered a main transaction is generated and represents a demand forecast from the OEM to a specific supplier. The transaction between the OEM and the supplier continuously updates. For example, each time the demand forecast changes, blockchain node 202 generates an updated version of the transaction which, after validation as mentioned above, is added to the blockchain and accessible by the supplier via blockchain node 204. Advantageously, based on the nature of blocks as mentioned above, a current version of a transaction also comprises a link to previous versions of the transaction, creating, in this instance, an immutable permanent record of current and previous forecasts and other operations. As shown in step 302, the current demand forecast comprises a data entry for each of the last 12 weeks wherein each data entry represents the number of units (e.g., 23, 24, 32, 33, . . . ) of a given commodity (e.g., hard disk drives or HDDs) that are projected by the OEM to be needed.

Step 304 illustrates sub-transactions associated with a supplier commitment. For example, based on the OEM demand forecast generated in step 302, assume a supplier commits to supply the needed commodity or material. This commit operation becomes the source of multiple sub-transactions corresponding to the main transaction and that are storable on the blockchain. A result of these sub-transactions is that the running forecast numbers in the main demand forecast transaction are updated. For example, assume the supplier makes a commitment for 52 units as of week 1 and a commitment for 92 units as of week 4. These two commitment operations are commit sub-transactions under the main demand forecast transaction, and can be added to the blockchain by the supplier via blockchain node 204. In response to these two sub-transactions, the OEM via blockchain node 202 re-calculates the running forecast (main transaction) based on its visibility in the blockchain of the commitments made by the supplier. Thus, based on the example numbers given in the FIG. 3 embodiment, up to and including week 4, the total demand is 23+24+32+33=112. However, the supplier is able to commit 52 units as of week 1 which will suffice through week 2. For week 3 and week 4 combined, there will be a shortage of 112−52=60, until the supplier's second commitment is available. With this visibility, the OEM can arrange with another supplier to supply the shortage of HDDs.

Step 306 illustrates one or more sub-transactions associated with an SLC. For example, assume the supplier ships the committed material (e.g., HDDs) to an SLC (e.g., a manufacturing warehouse). Once the material is received by the SLC, the SLC via blockchain node 206 updates the given sub-transaction against the commit to indicate how many units it has on hand. It is to be understood that an updated sub-transaction can also be considered a new sub-transaction since it goes through the validation process just like every other transaction being added to the blockchain. For example, the supplier may ship 40 units in week 1 and 12 units in week 2 (recall in step 304, the supplier committed 52 units as of week 1), thus the SLC will update the sub-transaction two times to reflect how many units it received. Visibility of these updates are available to the OEM via blockchain node 202. As such, as will be explained in subsequent steps below, the OEM may wait until all committed 52 units are shipped from the supplier to the SLC before authorizing a payment to the supplier. Also, now that the OEM has the clarity that the SLC has 40 units available and 12 are in transit, the OEM can better plan orders to an ODM (factory).

Step 308 illustrates a sub-transaction associated with a factory. For example, assume the SLC moves the committed material (e.g., HDDs) to a factory. This can be done at the time of order planning or prior thereto, and depends on the location of the SLC with respect to the factory. Oftentimes, the SLC is located on the factory property or close thereto. Once the material is received by the factory, the factory via blockchain node 208 updates the given sub-transaction (again, this can be considered a new sub-transaction) to reflect the number of units it has on hand, e.g., 40 units. Then, when the remaining 12 units are received, the factory can again update the given sub-transaction which is then also stored on the blockchain. These sub-transactions are visible to the OEM as well via blockchain node 202.

Step 310 illustrates a sub-transaction generated when the supplier raises the purchase order for payment since it has now satisfied its commitment by shipping 52 units. This activity is reflected in a sub-transaction that is stored on the blockchain via blockchain node 204 by the supplier and visible to the OEM via blockchain node 202.

Step 312 illustrates a sub-transaction generated when the OEM pays the supplier for the commit against the raised purchase order. This activity is reflected in a sub-transaction that is stored on the blockchain via blockchain node 202 by the OEM, along with an update to the main transaction reflecting the degree to which demand for the first two weeks has been satisfied. The transition for that commit operation is completed, which is now completely visible via blockchain node 202 by other systems and personnel of the OEM (e.g., system/personnel associated with inventory control, accounts payable, and ordering).

Step 314 illustrates how one or more sub-transactions can iterate on a given main transaction until completed or otherwise resolved. By way of example, if a supplier under commits, then a remediation/recovery process (or some other sub-transaction) will remain active until it is resolved. The interaction or remaining active functionality is reflected in step 314 by the circles adjacent to certain entries in the main transaction.

Thus, advantageously, illustrative embodiments provide a novel blockchain implementation on a procure-to-pay cycle wherein an initial main transaction (e.g., see step 302) is generated by the OEM to a supplier based on forecasted demand (which may also take into account backlogs), and remains opened (e.g., everlasting). Then subsequent transactions (small sub-transactions) are generated (e.g., see steps 304, 306, 308, 310, and 312) in response to the main transaction and are closed when resolved. By way of example only, once the invoice is generated by the supplier or, alternatively, once the invoice is paid by the OEM, the commit sub-transaction (e.g., see step 304) is closed. The other sub-transactions can be closed upon the occurrence of some event or action as well.

Figure 4:
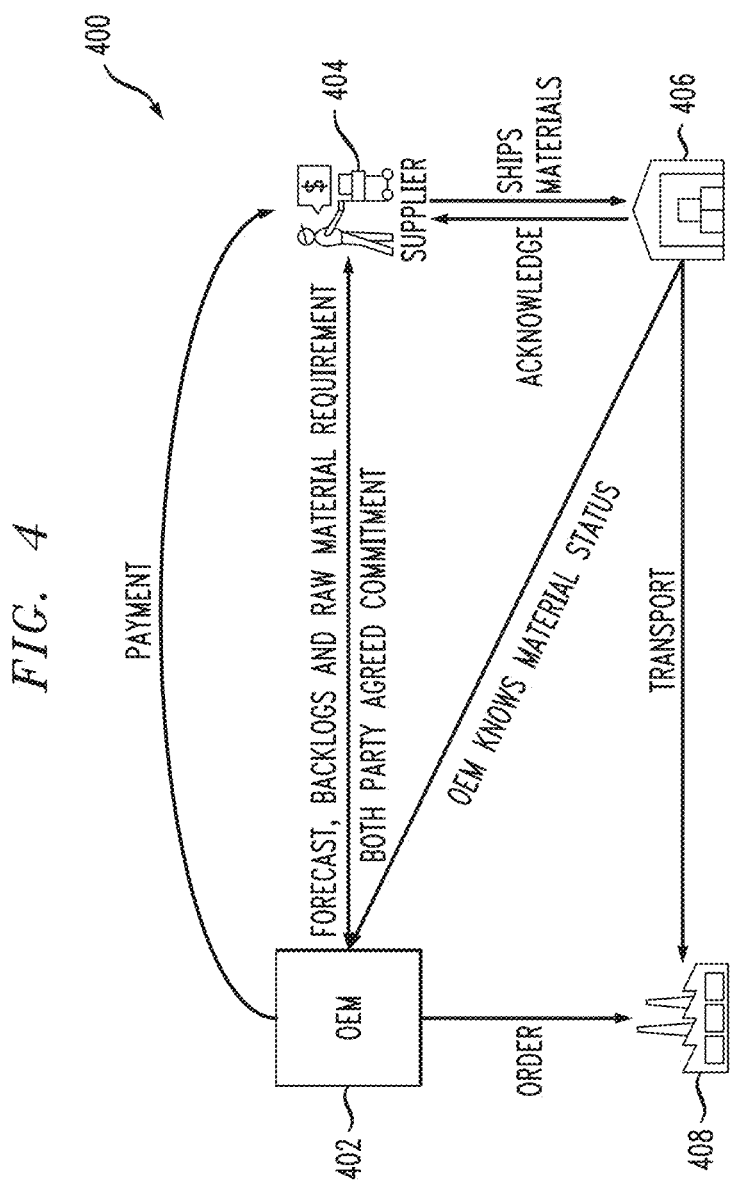
FIG. 4 illustrates operations that occur between entities in a supply chain model according to an illustrative embodiment.

FIG. 4 illustrates a flow diagram 400 summarizing operations that occur between the entities in the illustrative supply chain model that each generate one or more transactions that are stored on the blockchain. As shown, over blockchain architecture 200 in FIG. 2, OEM 402 shares forecasts, backlogs and raw material requirements with supplier 404 and, based on this information, both entities agree to one or more commitments. Supplier 404 ships the materials to SLC 406 which acknowledges receipt to the supplier 404. Based on the blockchain visibility, OEM 402 knows the status of the materials (e.g., how many units where were shipped by supplier 404 to SLC 406). SLC 406 ships the material to factory 408 which can then manufacture and fulfill an order using the material.

Figure 5:
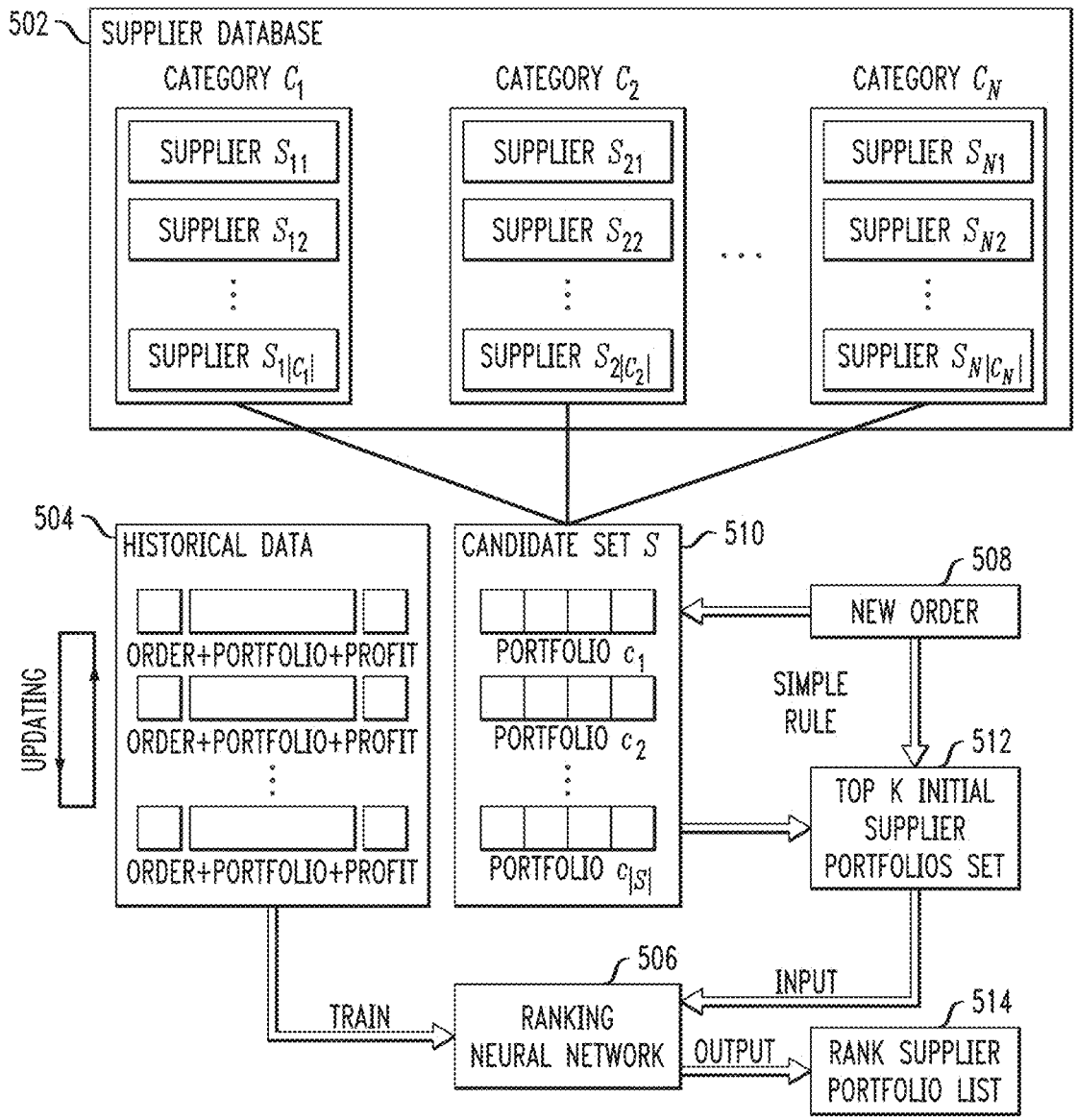
FIG. 5 illustrates a machine learning-based supplier ranking system according to an illustrative embodiment.

In addition to the blockchain functionalities described herein, supply chain management according to illustrative embodiments also provide machine learning-based (ML-based) functionalities for ranking suppliers. FIG. 5 illustrates an ML-based supplier ranking system 500 according to an illustrative embodiment. As shown, ML-based supplier ranking system 500 maintains a supplier database 502 of N suppliers ($S_1, \ldots, S_N$) for N categories ($C_1, \ldots, C_N$) of products/materials that an OEM may need to fulfill customer orders. For example, one category may be HDDs whereby there are multiple available suppliers. The number of suppliers and the number of product/material categories in supplier database 502 can be different. ML-based supplier ranking system 500 stores historical data 504 for past orders which, for each past order, includes the portfolio of suppliers for the given product/material category as well as profit data for the past order. Historical data 504 is updated for each order that is completed and, as will be further explained below, is used to train a ranking neural network 506.

Further as shown, for a new order 508 which may require more than one type of product/material category, a candidate set 510 of suppliers for each category is determined, and using some predetermined rule or policy (e.g., criteria specific to the OEM), identifies a set of top K supplier portfolios 512. These are the suppliers for each product/material category that are then input to the ranking neural network model 506 (trained using historical data 504). Neural network model 506 computes scores, as will be explained further below, for each supplier for a given product/material category, and outputs a ranked supplier portfolio list 514.

FIG. 6 illustrates a tabular representation of a set of scores 600 that are used by neural network model 506 to determine ranked supplier portfolio list 514 according to an illustrative embodiment. By way of example only, such scores may include an efficiency score 602, a flexibility score 604, a strength score 606, cost score 608, a time score 610, and a risk score 612. Efficiency score 602 represents a measure of a supplier with respect to efficiency in terms of production, capacity and location. Flexibility score 604 represents a measure of a supplier with respect to change flexibility in terms of quantity, quality and delivery. Strength score 606 represents a measure of a supplier with respect to quality level (e.g., product defect rate), innovation (e.g., new products), finance and specialization. Cost score 608 represents a cost competitiveness measure of a supplier with respect to competitive factors, payment terms, and volume discounts. Time score 610 represents a measure of a supplier with respect to delivery in terms of timeliness (e.g., on time and time to deliver). Risk score 612 represents a measure of a supplier with respect to overall risk in terms of operation, uncertainty and product defect percentage.

Figure 7:
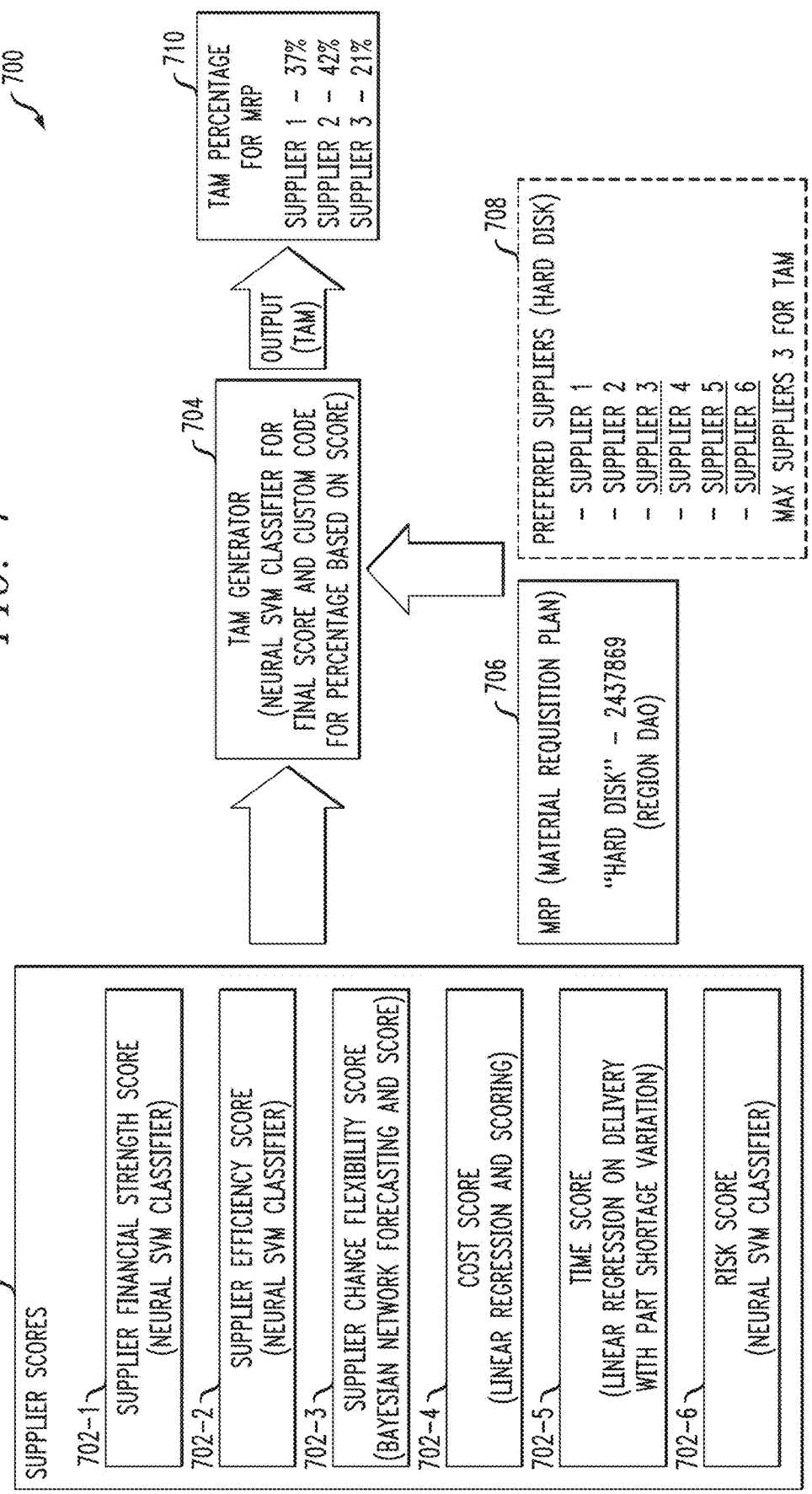
FIG. 7 illustrates a system for implementing at least a portion of a neural network model according to an illustrative embodiment.

FIG. 7 illustrates a system 700 for implementing at least a portion of neural network model 506 for generating the set of scores 600 using known ML-based functionalities (e.g., classification algorithms, Bayesian network forecasting algorithms, linear regression algorithms, etc.) according to an illustrative embodiment. For example, as shown, supplier scores 702 (corresponding to set of scores 600) are generated as follows. A supplier financial strength score 702-1 (corresponding to score 606) is generated using a neural support vector machine (SVM) classifier (classification algorithm). A supplier efficiency score 702-2 (corresponding to score 602) is generated using a neural SVM classifier as well. A supplier change flexibility score 702-3 (corresponding to score 604) is generated using a Bayesian network forecasting algorithm. Cost score 702-4 (corresponding to score 608) is generated using a linear regression algorithm. Time score 702-5 (corresponding to score 610) is generated using a linear regression algorithm as well. A risk score 702-6 (corresponding to score 612) is generated using a neural SVM classifier as well.

Supplier scores 702 are computed and then input to total availability material (TAM) generator 704 along with a material requisition plan (MRP) 706 and a preferred supplier list 708 for the product/material specified in MRP 706, e.g., an HDD. TAM is the total market demand for a product or service, calculated in annual revenue or unit sales if 100% of the available market is achieved. A TAM percentage allocation 710 is generated by TAM generator 704 for at least a subset of preferred suppliers from preferred supplier list 708 determined based on at least a portion of supplier scores 702. Thus, for example, as shown in 710, three suppliers are determined each with a TAM percentage allocated thereto, i.e., Supplier 1: 37%; Supplier 2: 42%; and Supplier 3: 21%.

Thus, OEM finds the efficient ranked supplier list for a given product using machine learning algorithms as described above in the context of systems 500/700. Once the suppliers and product/material expected from each supplier are identified, the transaction is initiated with the supplier maintaining details including backlog, on-hand, forecast, net supply, projected DSI (in this case, DSI is the stock that OEM expects over a future period), and run rate.

Figure 8:
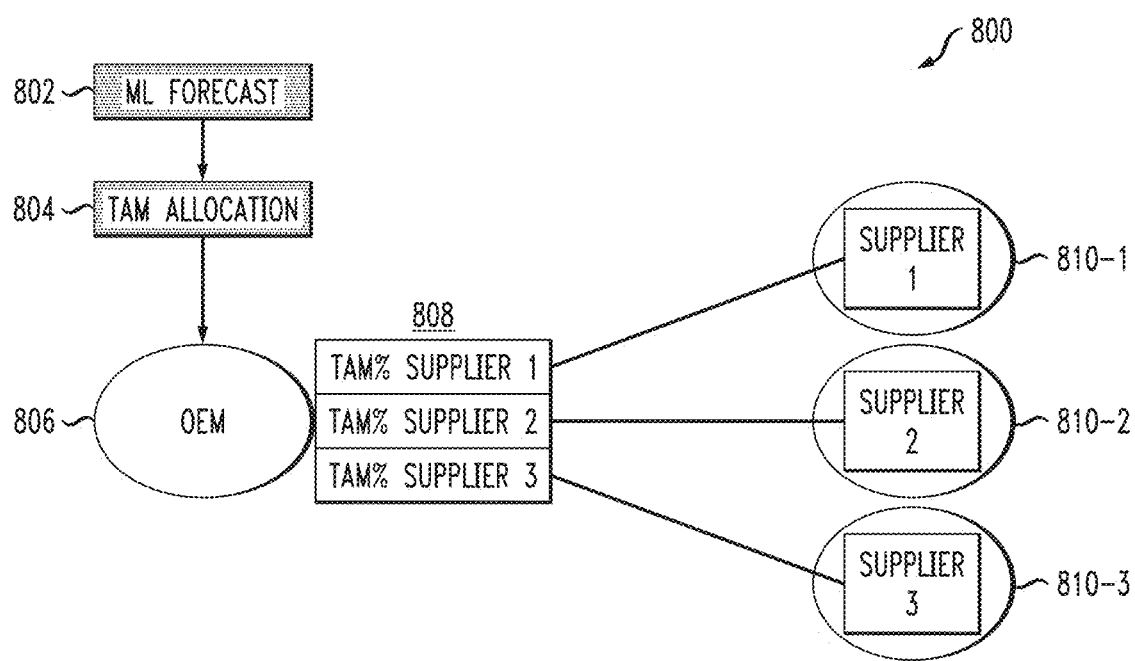
FIG. 8 illustrates a machine learning-based total availability material allocation methodology according to an illustrative embodiment.

FIG. 8 illustrates an example of an ML-based TAM methodology 800 according to an illustrative embodiment. As shown, an ML-computed demand forecast 802 is provided to TAM allocation module 804. It is to be appreciated that demand forecast 802 can be computed using one or more known ML algorithms. TAM allocation module 804, in some embodiments, implements all or parts of system 700 of FIG. 7. As explained above, a TAM percentage allocation 808 is generated for OEM 806 with respect to a set of preferred suppliers (e.g., top ranking suppliers based on scoring system described herein), i.e., Supplier 1 (810-1), Supplier 2 (810-2), and Supplier 3 (810-3). Assume, for example, that Supplier 1, Supplier 2, and Supplier 3 are preferred suppliers for Item FV56Y (Dell SKU Number for a solid state drive or SSD). As shown in FIG. 8, a TAM percentage is determined for each supplier for the given product/material.

As described herein, OEM generates a main demand forecast transaction and adds the transaction, once verified, to the blockchain. Block 902 in the set of blocks 900 of FIG. 9 is an example of such a transaction for Item FV56Y with respect to Supplier 1. Supplier 1 accesses the transaction via its corresponding blockchain node and analyzes the OEM demand. Considering next a four week corresponding to MRP_5 to MRP_8, the projected inventory demand from Supplier 1 is 3003. After analysis and logistic planning by Supplier 1, as shown, Supplier 1 committed 3048 units in week 1 against MRP_5, 6000 units in week 2 against MRP_6, 2000 units and 400 units in week 5 against MRP_7. Block 904 is a sub-transaction generated by Supplier 1 as an update against block 902, which is added to the blockchain and reflected back to the OEM.

As is evident, the first week is fine, but in the second week, Supplier 1 cannot send anything, and in the third week they will send 6000 units and then they will send 4000 units after the fourth week. If the safety stock is sufficient to absorb the week 2 deficiency, then the OEM can manage. Otherwise, the OEM will have to look toward another supplier to fill in the deficit, e.g., Supplier 2, Supplier 3, or both.

Herein lies one advantage of the blockchain architecture according to illustrative embodiments. The visibility through the blockchain of the transaction at the commitment against the forecasted demand enables the OEM to mitigate any deficiency issue upfront. Traditional business-to-business (B2B) communication cannot achieve this level of visibility.

Figure 10:
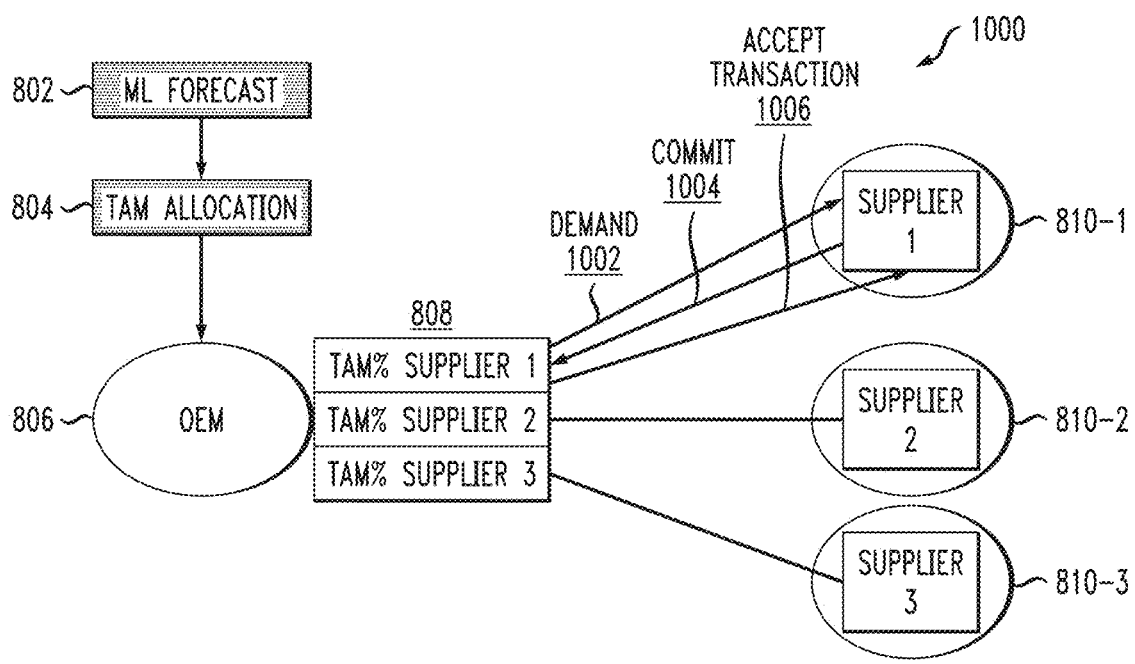
FIG. 10 illustrates an example of demand-commitment-acknowledgment interactions in the methodology of FIG. 8.

In accordance with the blockchain, the OEM acknowledges the supplier transaction, and initiates a sub-transaction for that commitment. FIG. 10 illustrates this interaction in terms of the ML-based TAM methodology of FIG. 8. More particularly, as shown in methodology 1000, OEM 806 generates demand 1002 directed to Supplier 1 (810-1) and, in response, Supplier 1 commits 1004 as described above. OEM 806 then confirms the commitment, i.e., accept transaction 1006. Advantageously, the interactions are all performed via the trusted and high-visibility environment of the blockchain architecture described herein.

Supplier 1 then initiates the transaction to an SLC (e.g., designated APCC) and ships the material to the SLC. Block 1102 in the set of block transactions 1100 of FIG. 11 is generated and added to the blockchain to show the shipment. The OEM can update on-hand inventory as expected inventory. Again, with traditional B2B communication, this visibility is not possible.

The SLC receives the material and updates the transaction as shown in block 1104. The OEM can update the expected inventory to OEM on-hand inventory.

The SLC moves the material to a factory and updates the transaction as shown in block 1106 (note that the SLC need not to move all the material, but can move the material as per the space available in the factory). For example, assume the SLC moves 1000 units. Now the OEM knows this is at the factory and the order will not be delayed for the day-to-day activity. The OEM also knows that the remaining 2048 units are at the SLC, which can be moved to the factory anytime. This level of visibility enables the OEM to reduce the safety stock.

In parallel or thereafter, Supplier 1 initiates the PO for the 3048 units that shipped and adds transaction as block 1108. The OEM now has total visibility of the commitment and the PO and can raise a demand note, or initiate the payment as shown in block 1110. Supplier 1 acknowledges the payment as shown in block 1112, and the sub-transaction iteration ends here.

Figure 12:
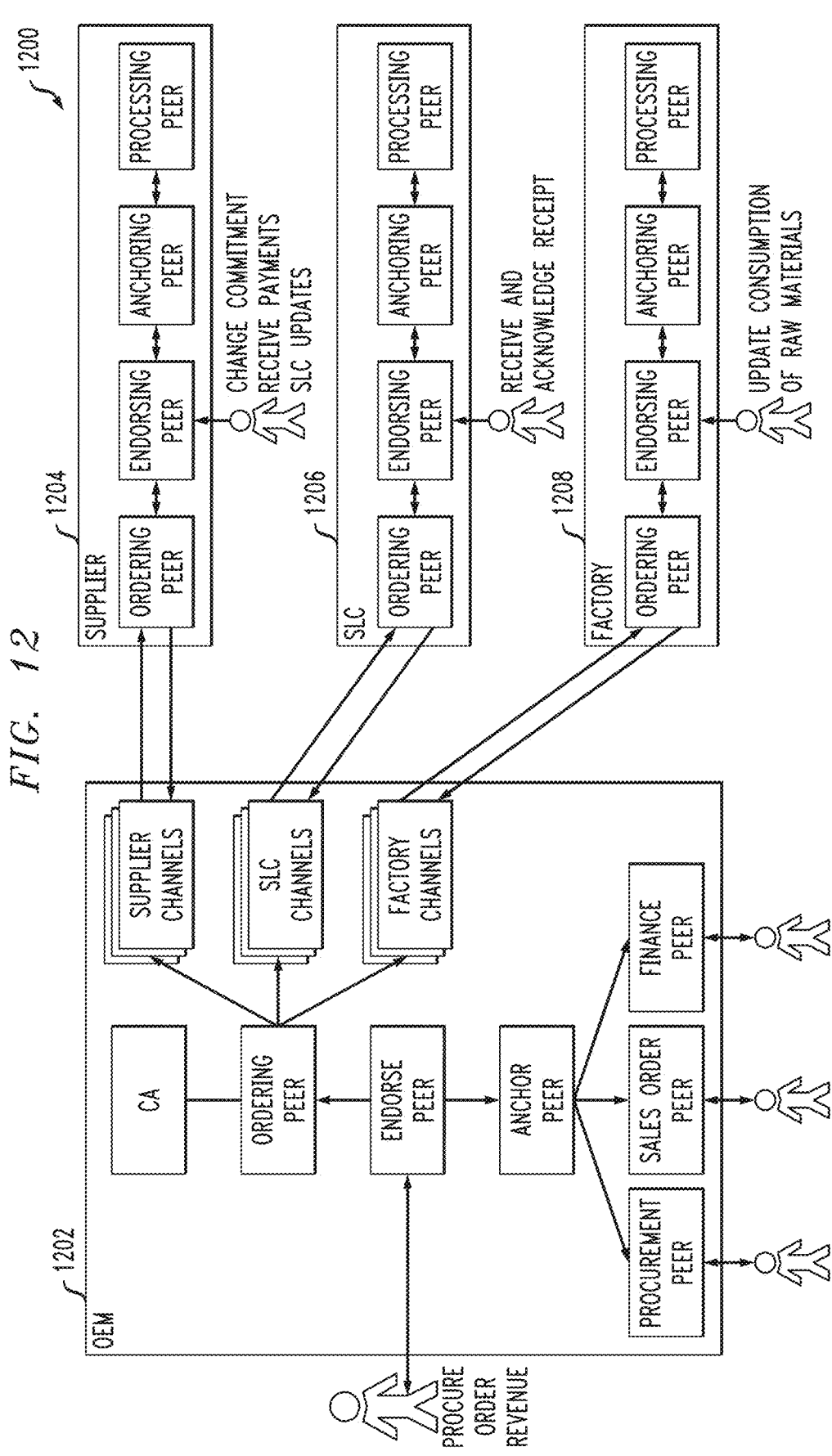
FIG. 12 illustrates a centralized blockchain methodology according to an illustrative embodiment.

In illustrative embodiments, the blockchain architecture uses private and restricted access to participants to the blockchain, e.g., the factory can see their order data, but within different factories they should not see orders of others, and the same is true with respect to vendors and customers. For example, in illustrative embodiments, the blockchain architecture implements a private permissioned blockchain, and the entire blockchain is controlled by the OEM using a centralized blockchain method as generally illustrated in FIG. 12. As shown, in the blockchain architecture 1200, a blockchain node 1202 for the OEM controls the blockchain and thus the permissioned access of the respective blockchain nodes of the other entities, i.e., blockchain node 1204 (Supplier), 1206 (SLC), and 1208 (Factory/ODM). The OEM blockchain node 1202 operates as a membership service provider (MSP). For example, in Hyperledger Fabric, a channel MSP identifies who has authorities at a channel level. The channel MSP defines the relationship between the identities of channel members and the enforcement of channel level policies. Thus, for example, the OEM blockchain node 1202 (as MSP) specifies that each of Supplier/SLC/Factory blockchain nodes 1204/1206/1208 respectively should see only their data. This is accomplished by the OEM blockchain node 1202 defining the channels and chain code. In some embodiments, affiliated factories that collaborate on manufacturing an order can share the same channel.

Figure 13:
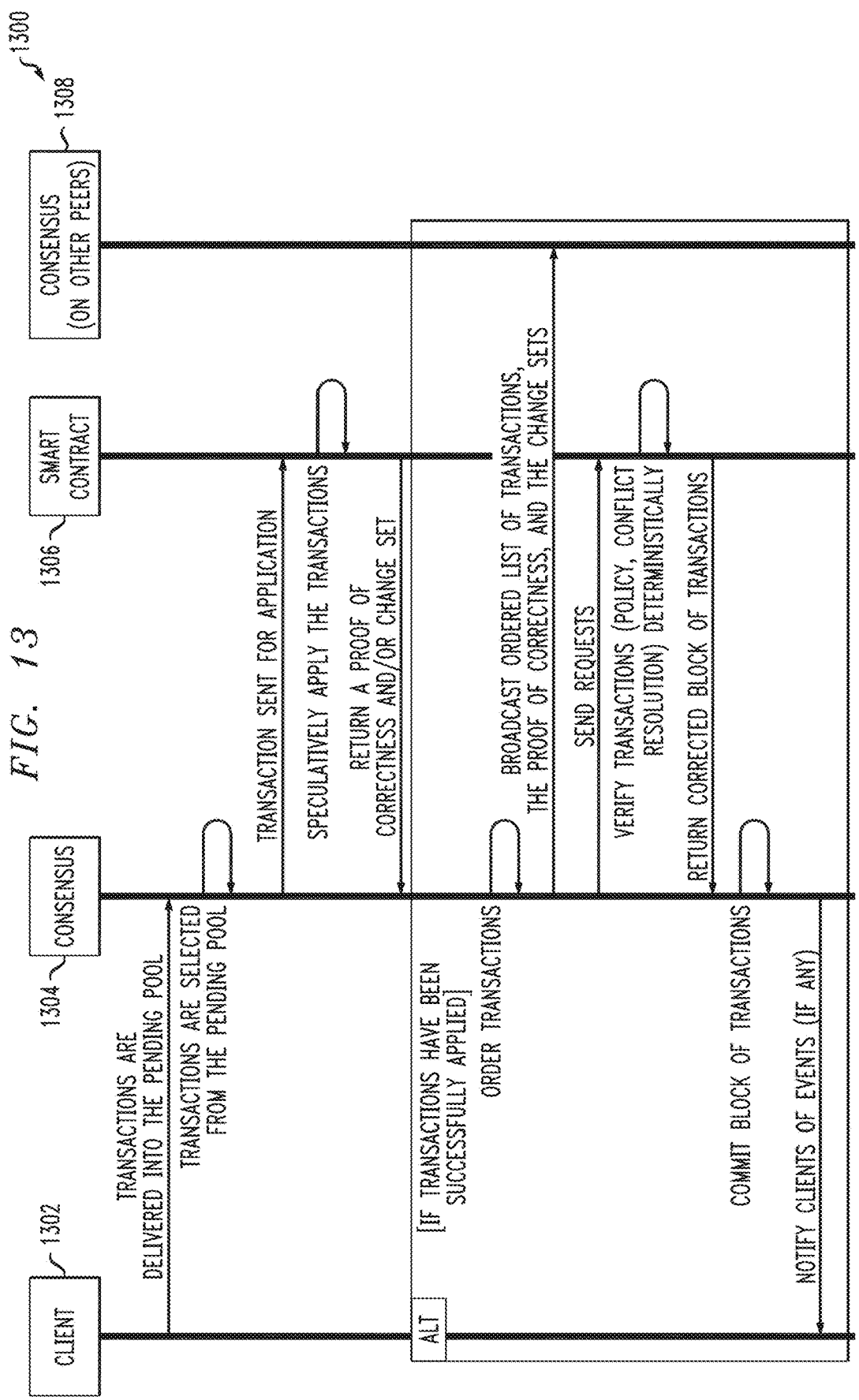
FIG. 13 illustrates a consensus flow in a blockchain according to an illustrative embodiment.

Furthermore, in OEM blockchain node 1202, an endorse peer is responsible for the certificate authority (CA) verification, rules and identity, and it executes the respective chain code (e.g., a smart contract) and approves transactions. Then, the transaction is then sent to an ordering peer and updated in the blockchain through the respective channel. Hyperledger Fabric supports proof of elapsed time, which is used as the consensus protocol in illustrative embodiments. FIG. 13 generally illustrates a consensus flow 1300 in a Hyperledger-based blockchain illustrating flow between a client 1302, consensus 1304, a smart contract 1306 and consensus 1308 on other peers.

Returning to the FIG. 12 embodiment, a supply chain life cycle starts with initiating the transaction on the forecast and TAM by the OEM blockchain node 1202. Each supplier (one supplier blockchain node 1204 is shown but it is to be understood that multiple suppliers via their blockchain nodes can be involved in this life cycle) will be demanded to send the raw material. The following main transaction initiation flow occurs:

Create Channel for Supplier→Join Peers in the Org to Supplier Channel→Install Chain Code on Peers→Initialize Chain Code on Channel→Place Genesis Block Transaction on Endorse Peer as the Forecast and TAM→Validate the Request→Approve/Reject→Submit Block to Ordering Peer→Update the Block for the Channel→Commit The Block in Ledger→Ordering Peer invokes Endorse in Supplier→Approve or Reject-→Anchor peer distribute this to Generic Processing Peer→Supplier Reads the Block→Update the Forecast and Commitment to the Block→Initiate transaction on Endorsing Peer→Approve/Reject→Commit Transaction in Ledger→Anchor Peer publish to Generic Processing Peer→OEM Reads→Initiate transaction on Endorsing Peer→Approve/Reject→Commit Transaction in Ledger→Anchor Peer publish to Generic Processing Peer.

From here, the following sub-transaction flow occurs:

Create Channel for Supplier→Join Peers in the Org to Supplier Channel→Install Chain Code on Peers→Initialize Chain Code on Channel→Place Genesis Block Transaction on Endorse Peer as the Commitment from supplier→Supplier reads the block→Supplier updates the shipment to SLC→SLC Reads→Acknowledge the Block→OEM/Supplier Reads→Life Cycle completes when OEM Pay to the Supplier for the shipment More particularly, the flow may be described as follow:

1. OEM procurement initializes the block with forecast/TAM for a specific supplier (Supplier).
2. Supplier amends quality and update parameters with the commitment (i.e., may be whole request or partial request) of shipping from the OEM request.
3. OEM acknowledges and this transaction is kept open.
4. OEM re-calculates the forecast based on the commitment and other factors. If needed, OEM updates other supplier forecasts for the shortage.
5. OEM initiates a new transaction with the commitment.
6. Supplier sends raw material to SLC.
7. SLC acknowledges receipt.
8. OEM reads acknowledgment.
9. SLC sends the quantity in stock to Factory.
10. Factory acknowledges receipt.
11. OEM reads acknowledgement.
12. Supplier raises purchase order to OEM against the commitment and shipment to SLC.
13. OEM acknowledges and releases the payment to Supplier.
14. Life cycle of sub-transaction ends when Supplier commitment is equal to the TAM material request to the Supplier.

Figure 14:
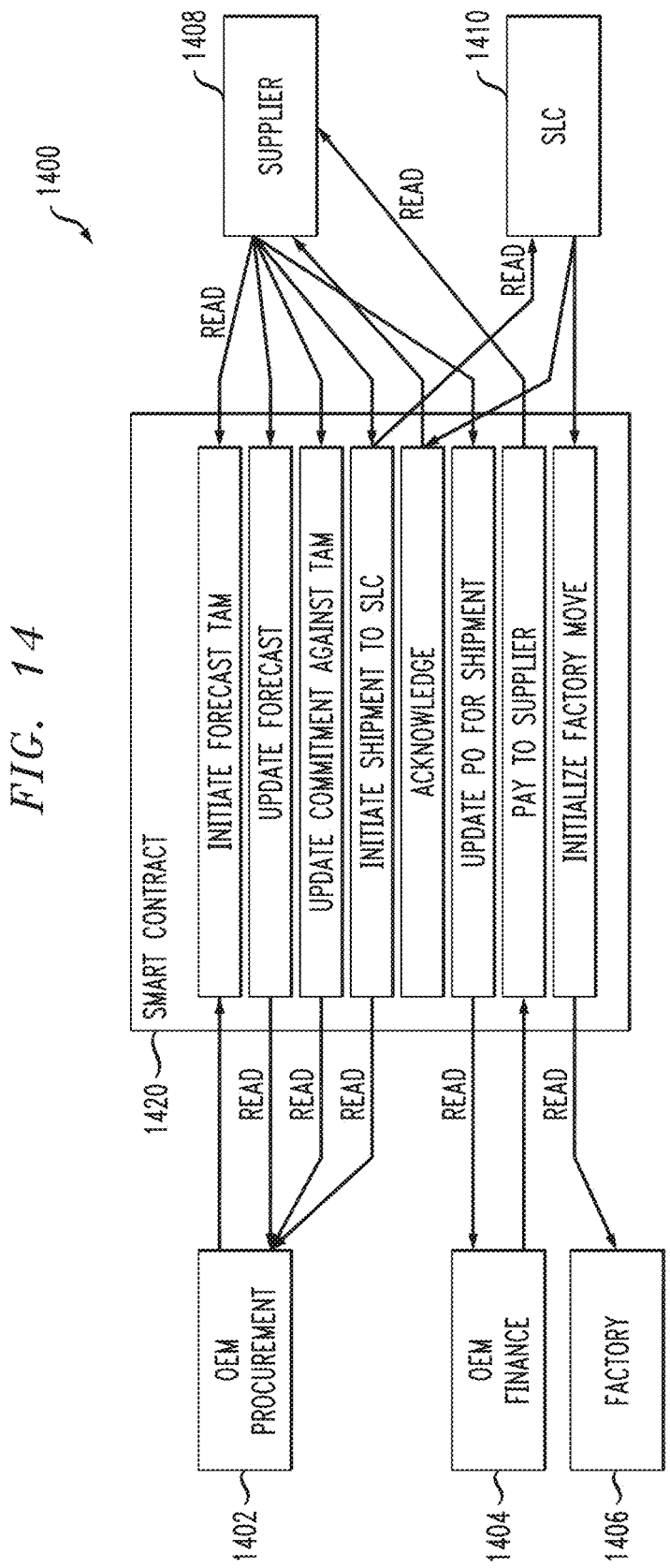
FIG. 14 illustrates a blockchain snippet according to an illustrative embodiment.

FIG. 14 generally illustrates the above-described flow in the context of a blockchain snippet 1400 corresponding to an OEM procurement entity 1402, an OEM finance entity 1404, a factory entity 1406, a supplier entity 1408 and an SLC entity 1410 with respect to a smart contract 1420.

Illustrative embodiments are described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Cloud infrastructure can include private clouds, public clouds, and/or combinations of private/public clouds (hybrid clouds).

Figure 15:
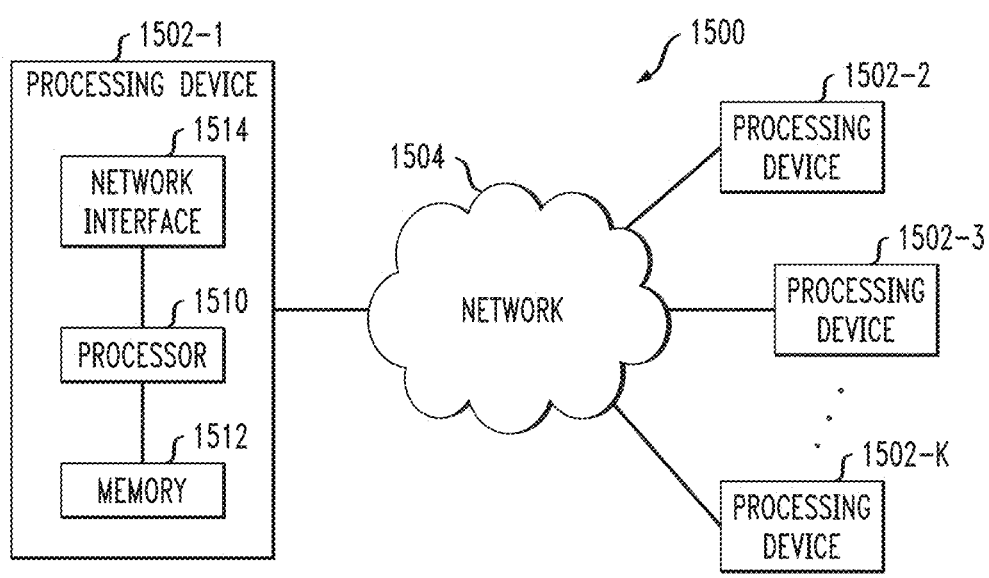
FIG. 15 illustrates an example of a processing platform that may be utilized to implement at least a portion of an information processing system for supply chain management functionalities according to an illustrative embodiment.

FIG. 15 depicts a processing platform 1500 used to implement information processing systems/processes 100 through 1400 depicted in FIGS. 1 through 14, respectively, according to an illustrative embodiment. More particularly, processing platform 1500 is a processing platform on which a computing environment with functionalities described herein can be implemented.

The processing platform 1500 in this embodiment comprises a plurality of processing devices, denoted 1502-1, 1502-2, 1502-3, . . . 1502-K, which communicate with one another over network(s) 1504. It is to be appreciated that the methodologies described herein may be executed in one such processing device 1502, or executed in a distributed manner across two or more such processing devices 1502. It is to be further appreciated that a server, a client device, a computing device or any other processing platform element may be viewed as an example of what is more generally referred to herein as a "processing device." As illustrated in FIG. 15, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 1502 shown in FIG. 15. The network(s) 1504 represent one or more communications networks that enable components to communicate and to transfer data therebetween, as well as to perform other functionalities described herein.

The processing device 1502-1 in the processing platform 1500 comprises a processor 1510 coupled to a memory 1512. The processor 1510 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1510. Memory 1512 (or other storage device) having such program code embodied therein is an example of what is more generally referred to herein as a processor-readable storage medium. Articles of manufacture comprising such computer-readable or processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1512 may comprise electronic memory such as random-access memory (RAM), read-only memory (ROM) or other types of memory, in any combination. The one or more software programs when executed by a processing device such as the processing device 1502-1 causes the device to perform functions associated with one or more of the components/steps of system/methodologies in FIGS. 1 through 14. One skilled in the art would be readily able to implement such software given the teachings provided herein. Other examples of processor-readable storage media embodying embodiments of the invention may include, for example, optical or magnetic disks.

Processing device 1502-1 also includes network interface circuitry 1514, which is used to interface the device with the networks 1504 and other system components. Such circuitry may comprise conventional transceivers of a type well known in the art.

The other processing devices 1502 (1502-2, 1502-3, . . . 1502-K) of the processing platform 1500 are assumed to be configured in a manner similar to that shown for computing device 1502-1 in the figure.

The processing platform 1500 shown in FIG. 15 may comprise additional known components such as batch processing systems, parallel processing systems, physical machines, virtual machines, virtual switches, storage volumes, etc. Again, the particular processing platform shown in this figure is presented by way of example only, and the system shown as 1500 in FIG. 15 may include additional or alternative processing platforms, as well as numerous distinct processing platforms in any combination.

Also, numerous other arrangements of servers, clients, computers, storage devices or other components are possible in processing platform 1500. Such components can communicate with other elements of the processing platform 1500 over any type of network, such as a wide area network (WAN), a local area network (LAN), a satellite network, a telephone or cable network, or various portions or combinations of these and other types of networks.

Furthermore, it is to be appreciated that the processing platform 1500 of FIG. 15 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 1500 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

The particular processing operations and other system functionality described in conjunction with FIGS. 1-15 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention.

What is claimed is:

1. An apparatus comprising:
at least one processing device comprising a processor coupled to a memory, the at least one processing device, when executing program code, is configured to:
generate an initial transaction representing a forecasted demand for material needed to manufacture equipment via a supply chain;
add the initial transaction to a blockchain for access by entities in the supply chain comprising at least a subset of one or more supply entities, one or more material distribution entities, and one or more manufacturing entities;
generate a ranking of the one or more supply entities based on a set of scores generated using one or more machine learning algorithms;
compute a total availability of material percentage for each of the one or more supply entities based on at least a portion of the set of scores;
cause initiation of one or more orders for material, based on the computed total availability of material percentage for each of the one or more supply entities, by sending an order request to the one or more supply entities, to enable avoidance of a shortage of material needed to manufacture equipment; and
cause shipment of the one or more orders for material to the one or more manufacturing entities, enabling the one or more manufacturing entities to fulfill a given order of the one or more orders using the material;
wherein the blockchain is secured through a hash value, the hash value changing from a first hash value to a second hash value based on an alteration of an item of data in the blockchain;
wherein generating a ranking of the one or more supply entities comprises implementing the one or more machine learning algorithms to generate the set of scores utilizing a supplier database comprising a plurality of suppliers and a plurality of categories of material needed to manufacture equipment via the supply chain, the one or more machine learning algorithms comprising at least one neural network configured to generate at least a portion of the set of scores utilized in the ranking of the one or more supply entities;
wherein the set of scores are based on one or more of an efficiency score value, a flexibility score value, a strength score value, a cost score value, a time score value, and a risk score value; and
wherein the one or more machine learning algorithms comprising the at least one neural network are trained by:
storing historical data for one or more past orders;
creating a first training set comprising the stored historical data for one or more past orders, the historical data comprising a plurality of suppliers used for the one or more past orders, a given product or material category for the one or more past orders, and profit data for the one or more past orders;

training the one or more machine learning algorithms in a first stage using the first training set;
creating a second training set for a second stage of training comprising updating the historical data set of the first training set with additional historical data for each of a plurality of subsequent completed orders; and
training the one or more machine learning algorithms in a second stage using the second training set.

2. The apparatus of claim 1, wherein the at least one processing device, when executing program code, is further configured to access via the blockchain a transaction generated by one of the supply entities in response to the initial transaction, wherein the generated transaction represents a commitment by the one of the supply entities to supply at least a portion of the material in the forecasted demand.

3. The apparatus of claim 2, wherein the at least one processing device, when executing program code, is further configured to, in response to accessing the transaction generated by the one of the supply entities, re-calculate the forecasted demand based on the commitment by the one of the supply entities.

4. The apparatus of claim 3, wherein the at least one processing device, when executing program code, is further configured to, in response to re-calculating the forecasted demand, generate another transaction requesting a commitment by one or more other ones of the supply entities for material needed based on the re-calculated forecasted demand, and add the other transaction to the blockchain.

5. The apparatus of claim 2, wherein the at least one processing device, when executing program code, is further configured to access via the blockchain a transaction generated by one of the material distribution entities in response to shipment of committed materials by the one of the supply entities to the one of the material distribution entities.

6. The apparatus of claim 5, wherein the at least one processing device, when executing program code, is further configured to access via the blockchain a transaction generated by one of the manufacturing entities in response to shipment of committed materials by the one of the material distribution entities to the one of the manufacturing entities.

7. The apparatus of claim 6, wherein the at least one processing device, when executing program code, is further configured to access via the blockchain a transaction generated by the one of the supply entities that committed the material, wherein the generated transaction represents a request for payment for the committed material.

8. The apparatus of claim 7, wherein the initial transaction is a main transaction and the transaction representing the commitment by the one of the supply entities is a sub-transaction of the main transaction, and the sub-transaction is closed in the blockchain upon one of the request for payment for the committed material or payment of the request for payment.

9. The apparatus of claim 1, wherein the at least one processing device, when executing program code, is further configured to control access to transactions on the blockchain by the one or more supply entities, the one or more material distribution entities, and the one or more manufacturing entities.

10. The apparatus of claim 1, wherein the blockchain is implementable via a distributed, decentralized computer network of compute nodes, wherein a first compute node of the compute nodes is assignable to the one or more supply entities, a second compute node of the compute nodes is assignable to the one or more material distribution entities, and a third compute node of the compute nodes is assignable to the one or more manufacturing entities, wherein each of the first compute node, the second compute node and the third compute node is configurable to maintain a respective blockchain which is a cryptographically secured ledger of data blocks that represent respective transactions within a given computational environment.

11. The apparatus of claim 1, wherein the set of scores are combined utilizing a neural support vector machine classifier to generate a final score; and wherein the total availability of material percentage for given number of supply entities of a subset of the one or more supply entities is generated based on the final score.

12. A method comprising:
generating an initial transaction representing a forecasted demand for material needed to manufacture equipment via a supply chain;
adding the initial transaction to a blockchain for access by entities in the supply chain comprising at least a subset of one or more supply entities, one or more material distribution entities, and one or more manufacturing entities;
generating a ranking of the one or more supply entities based on a set of scores generated using one or more machine learning algorithms;
computing a total availability of material percentage for each of the one or more supply entities based on at least a portion of the set of scores;
causing initiation of one or more orders for material, based on the computed total availability of material percentage for each of the one or more supply entities, by sending an order request to the one or more supply entities, to enable avoidance of a shortage of material needed to manufacture equipment; and
causing shipment of the one or more orders for material to the one or more manufacturing entities, enabling the one or more manufacturing entities to fulfill a given order of the one or more orders using the material;
wherein the blockchain is secured through a hash value, the hash value changing from a first hash value to a second hash value based on an alteration of an item of data in the blockchain;
wherein generating a ranking of the one or more supply entities comprises implementing the one or more machine learning algorithms to generate the set of scores utilizing a supplier database comprising a plurality of suppliers and a plurality of categories of material needed to manufacture equipment via the supply chain, the one or more machine learning algorithms comprising at least one neural network configured to generate at least a portion of the set of scores utilized in the ranking of the one or more supply entities;
wherein the set of scores are based on one or more of an efficiency score value, a flexibility score value, a strength score value, a cost score value, a time score value, and a risk score value;
wherein the one or more machine learning algorithms comprising the at least one neural network are trained by:
storing historical data for one or more past orders;
creating a first training set comprising the stored historical data for one or more past orders, the historical data comprising a plurality of suppliers used for the one or more past orders, a given product or material category for the one or more past orders, and profit data for the one or more past orders;

training the one or more machine learning algorithms in a first stage using the first training set;

creating a second training set for a second stage of training comprising updating the historical data set of the first training set with additional historical data for each of a plurality of subsequent completed orders; and training the one or more machine learning algorithms in a second stage using the second training set; and training the at least one neural network in a second stage using the second training set; and wherein the steps are performed by at least one processing device comprising a processor, coupled to a memory, when executing program code.

13. The method of claim 12, further comprising accessing via the blockchain a transaction generated by one of the supply entities in response to the initial transaction, wherein the generated transaction represents a commitment by the one of the supply entities to supply at least a portion of the material in the forecasted demand.

14. The method of claim 13, further comprising, in response to accessing the transaction generated by the one of the supply entities, re-calculating the forecasted demand based on the commitment by the one of the supply entities.

15. The method of claim 14, further comprising, in response to re-calculating the forecasted demand, generating another transaction requesting a commitment by one or more other ones of the supply entities for material needed based on the re-calculated forecasted demand, and adding the other transaction to the blockchain.

16. The method of claim 13, further comprising accessing via the blockchain a transaction generated by one of the material distribution entities in response to shipment of committed materials by the one of the supply entities to the one of the material distribution entities.

17. The method of claim 16, further comprising accessing via the blockchain a transaction generated by one of the manufacturing entities in response to shipment of committed materials by the one of the material distribution entities to the one of the manufacturing entities.

18. The method of claim 12, wherein the blockchain is implementable via a distributed, decentralized computer network of compute nodes, wherein a first compute node of the compute nodes is assignable to the one or more supply entities, a second compute node of the compute nodes is assignable to the one or more material distribution entities, and a third compute node of the compute nodes is assignable to the one or more manufacturing entities, wherein each of the first compute node, the second compute node and the third compute node is configurable to maintain a respective blockchain which is a cryptographically secured ledger of data blocks that represent respective transactions within a given computational environment.

19. A computer program product comprising a non-transitory processor-readable storage medium having stored therein program code of one or more software programs, wherein the program code when executed by at least one processing device causes the at least one processing device to:

generate an initial transaction representing a forecasted demand for material needed to manufacture equipment via a supply chain;

add the initial transaction to a blockchain for access by entities in the supply chain comprising at least a subset of one or more supply entities, one or more material distribution entities, and one or more manufacturing entities;

generate a ranking of the one or more supply entities based on a set of scores generated using one or more machine learning algorithms;

compute a total availability of material percentage for each of the one or more supply entities based on at least a portion of the set of scores;

cause initiation of one or more orders for material, based on the computed total availability of material percentage for each of the one or more supply entities, by sending an order request to the one or more supply entities, to enable avoidance of a shortage of material needed to manufacture equipment; and cause shipment of the one or more orders for material to the one or more manufacturing entities, enabling the one or more manufacturing entities to fulfill a given order of the one or more orders using the material;

wherein the blockchain is secured through a hash value, the hash value changing from a first hash value to a second hash value based on an alteration of an item of data in the blockchain;

wherein generating a ranking of the one or more supply entities comprises implementing the one or more machine learning algorithms to generate the set of scores utilizing a supplier database comprising a plurality of suppliers and a plurality of categories of material needed to manufacture equipment via the supply chain, the one or more machine learning algorithms comprising at least one neural network configured to generate at least a portion of the set of scores utilized in the ranking of the one or more supply entities;

wherein the set of scores are based on one or more of an efficiency score value, a flexibility score value, a strength score value, a cost score value, a time score value, and a risk score value; and wherein the one or more machine learning algorithms comprising the at least one neural network are trained by:

storing historical data for one or more past orders;

creating a first training set comprising the stored historical data for one or more past orders, the historical data comprising a plurality of suppliers used for the one or more past orders, a given product or material category for the one or more past orders, and profit data for the one or more past orders;

training the one or more machine learning algorithms in a first stage using the first training set;

creating a second training set for a second stage of training comprising updating the historical data set of the first training set with additional historical data for each of a plurality of subsequent completed orders; and training the one or more machine learning algorithms in a second stage using the second training set.

20. The computer program product of claim 19, wherein the blockchain is implementable via a distributed, decentralized computer network of compute nodes, wherein a first compute node of the compute nodes is assignable to the one or more supply entities, a second compute node of the compute nodes is assignable to the one or more material distribution entities, and a third compute node of the compute nodes is assignable to the one or more manufacturing entities, wherein each of the first compute node, the second compute node and the third compute node is configurable to maintain a respective blockchain which is a cryptographically secured ledger of data blocks that represent respective transactions within a given computational environment.

* * * * *